(12) United States Patent
Parekh et al.

(10) Patent No.: US 11,165,500 B2
(45) Date of Patent: Nov. 2, 2021

(54) CASCADABLE DATA COMMUNICATION CABLE ASSEMBLY

(71) Applicant: COSEMI TECHNOLOGIES, INC., Irvine, CA (US)

(72) Inventors: Devang Parekh, Castro Valley, CA (US); David Miller, San Francisco, CA (US); Nguyen X. Nguyen, Irvine, CA (US)

(73) Assignee: Mobix Labs, Inc., Irvine, CA (US)

( * ) Notice: Subject to any disclaimer, the term of this patent is extended or adjusted under 35 U.S.C. 154(b) by 0 days.

(21) Appl. No.: 16/797,491

(22) Filed: Feb. 21, 2020

(65) Prior Publication Data
US 2021/0266072 A1 Aug. 26, 2021

(51) Int. Cl.
  *H04B 10/29* (2013.01)
  *H04B 3/06* (2006.01)
  *H04B 3/36* (2006.01)

(52) U.S. Cl.
  CPC ............ *H04B 10/29* (2013.01); *H04B 3/06* (2013.01); *H04B 3/36* (2013.01)

(58) Field of Classification Search
  None
  See application file for complete search history.

(56) References Cited

U.S. PATENT DOCUMENTS

| | | |
|---|---|---|
| 3,622,952 A | 11/1971 | Hilbert |
| 3,721,869 A | 3/1973 | Paoli |
| 4,451,916 A | 5/1984 | Casper et al. |
| 4,585,292 A | 4/1986 | Frantz et al. |

(Continued)

FOREIGN PATENT DOCUMENTS

| | | |
|---|---|---|
| EP | 0400896 A2 | 12/1990 |
| EP | 1331497 A2 | 7/2003 |

(Continued)

OTHER PUBLICATIONS

International Search Report and Written Opinion for International Application No. PCT/US2012/057520 dated Feb. 1, 2013, 13 pages.

(Continued)

*Primary Examiner* — Darren E Wolf
(74) *Attorney, Agent, or Firm* — Stetina Brunda Garred & Brucker

(57) ABSTRACT

Various implementations of a data communication cable assembly are disclosed that improve the transmission of data signals that traverse long distances. Some cable assembly implementations are configured to transmit data signals via one or more electrical wire mediums and one or more signal extenders that modify the data signals for improved transmission between devices over one or more electrical wire mediums. Other cable assembly implementations are configured to transmit data signals via one or more optical transmission mediums and optical-to-electrical and electrical-to-optical converters for improved transmission of the data signals between devices. Other cable assembly implementations are configured for cascading or daisy-chaining together for transmitting data signals between devices in the optical and/or electrical domain.

20 Claims, 17 Drawing Sheets

(56) References Cited

U.S. PATENT DOCUMENTS

| | | | |
|---|---|---|---|
| 4,645,295 A * | 2/1987 | Pronovost | G02B 6/3831 |
| | | | 385/55 |
| 4,720,630 A * | 1/1988 | Takeuchi | G02B 6/4202 |
| | | | 250/227.24 |
| 4,733,934 A * | 3/1988 | Wais | G02B 6/4284 |
| | | | 250/227.24 |
| 4,753,510 A * | 6/1988 | Sezerman | G02B 6/3843 |
| | | | 385/61 |
| 4,990,106 A | 2/1991 | Szegda | |
| 5,416,872 A | 5/1995 | Sizer et al. | |
| 5,430,568 A | 7/1995 | Little et al. | |
| 5,587,884 A | 12/1996 | Raman | |
| 5,966,387 A | 10/1999 | Cloutier | |
| 6,169,746 B1 | 1/2001 | Ueda | |
| 6,366,717 B1 | 4/2002 | Buabbud | |
| 6,517,259 B1 | 2/2003 | Murata | |
| 6,626,585 B1 | 9/2003 | Malone | |
| 6,931,177 B2 | 8/2005 | Suzuki | |
| 6,931,183 B2 | 8/2005 | Panak et al. | |
| 6,940,477 B2 | 9/2005 | Moon et al. | |
| 7,068,892 B1 | 6/2006 | Lu et al. | |
| 7,155,134 B2 | 12/2006 | Azadet | |
| 7,257,297 B2 | 8/2007 | Kondo | |
| 7,301,139 B1 | 11/2007 | Sakurai et al. | |
| 7,319,232 B1 | 1/2008 | Bell | |
| 7,334,946 B2 | 2/2008 | Lu | |
| 7,418,175 B2 | 8/2008 | Aizpuru et al. | |
| 7,551,852 B2 | 6/2009 | Reintjes et al. | |
| 7,583,867 B2 | 9/2009 | Terada et al. | |
| 7,602,739 B2 | 10/2009 | Weigert | |
| 7,706,692 B2 | 4/2010 | Tatum et al. | |
| 7,714,677 B2 | 5/2010 | Wang | |
| 7,734,183 B2 | 6/2010 | Whitehead | |
| RE41,742 E | 9/2010 | Furuyama | |
| 7,941,052 B2 | 5/2011 | Epitaux et al. | |
| 8,068,742 B2 | 11/2011 | Cole et al. | |
| 8,075,342 B1 * | 12/2011 | Harney | G10H 3/186 |
| | | | 439/620.01 |
| 8,233,805 B2 | 7/2012 | Tatum et al. | |
| 8,235,603 B2 | 8/2012 | Tamura et al. | |
| 8,251,594 B2 | 8/2012 | Lavoie et al. | |
| 8,630,305 B2 | 1/2014 | Anderson | |
| 8,804,792 B1 | 8/2014 | Cheung et al. | |
| 8,805,195 B2 | 8/2014 | Mateosky et al. | |
| 8,824,898 B2 | 9/2014 | Groepl et al. | |
| 8,831,436 B2 | 9/2014 | Evans et al. | |
| 8,834,041 B2 | 9/2014 | Ertel et al. | |
| 8,935,740 B2 | 1/2015 | Suzuki et al. | |
| 8,948,197 B2 | 2/2015 | Jiang et al. | |
| 9,025,971 B2 | 5/2015 | Ide | |
| 9,040,823 B2 | 5/2015 | Horan et al. | |
| 9,076,575 B2 | 7/2015 | Horan et al. | |
| 9,191,251 B2 | 11/2015 | Shibata | |
| 9,337,993 B1 | 5/2016 | Lugthart | |
| 9,397,750 B2 | 7/2016 | Parekh et al. | |
| 9,397,751 B2 | 7/2016 | Parekh et al. | |
| 9,602,116 B1 | 3/2017 | Le et al. | |
| 9,813,153 B2 | 11/2017 | Parekh et al. | |
| 10,033,434 B1 | 7/2018 | Haynes et al. | |
| 10,326,245 B1 | 6/2019 | Parekh et al. | |
| 10,498,523 B1 | 12/2019 | Wang et al. | |
| 2002/0054409 A1 | 5/2002 | Bartur | |
| 2002/0126967 A1 | 9/2002 | Panak et al. | |
| 2003/0011879 A1 | 1/2003 | Kasahara et al. | |
| 2003/0129872 A1 | 7/2003 | Tolmie | |
| 2003/0132941 A1 | 7/2003 | Echizenya | |
| 2004/0056732 A1 | 3/2004 | Errington | |
| 2004/0070411 A1 | 4/2004 | Self et al. | |
| 2004/0184746 A1 | 9/2004 | Chang et al. | |
| 2004/0223704 A1 | 11/2004 | Fujii et al. | |
| 2005/0008302 A1 | 1/2005 | Miyamae | |
| 2005/0146389 A1 * | 7/2005 | Gwinn | H03F 3/1855 |
| | | | 333/32 |
| 2005/0169596 A1 | 8/2005 | Hamasaki et al. | |
| 2006/0024067 A1 | 2/2006 | Koontz | |
| 2006/0034358 A1 | 2/2006 | Okamura | |
| 2006/0045434 A1 | 3/2006 | Numata et al. | |
| 2006/0188202 A1 * | 8/2006 | Deans | H04B 10/294 |
| | | | 385/100 |
| 2006/0221948 A1 | 10/2006 | Benner et al. | |
| 2006/0268167 A1 | 11/2006 | Cole et al. | |
| 2006/0291783 A1 | 12/2006 | Hamasaki et al. | |
| 2007/0014522 A1 | 1/2007 | Yamaguchi et al. | |
| 2007/0031092 A1 | 2/2007 | Saitoh et al. | |
| 2007/0237463 A1 | 10/2007 | Aronson | |
| 2007/0237470 A1 | 10/2007 | Aronson et al. | |
| 2007/0281542 A1 * | 12/2007 | Palinkas | H01R 24/42 |
| | | | 439/585 |
| 2007/0286600 A1 | 12/2007 | Guo et al. | |
| 2008/0031629 A1 | 2/2008 | Nguyen et al. | |
| 2008/0107424 A1 | 5/2008 | Tonietto et al. | |
| 2009/0009662 A1 | 1/2009 | Manapragada et al. | |
| 2009/0060425 A1 | 3/2009 | Aronson | |
| 2009/0092398 A1 | 4/2009 | Graber | |
| 2009/0148165 A1 | 6/2009 | Kim et al. | |
| 2009/0260043 A1 | 10/2009 | Tatsuta et al. | |
| 2009/0269013 A1 | 10/2009 | Durand et al. | |
| 2010/0003861 A1 * | 1/2010 | Hetzer | H01R 13/7193 |
| | | | 439/676 |
| 2010/0150573 A1 | 6/2010 | Furuyama | |
| 2010/0284323 A1 | 11/2010 | Tang et al. | |
| 2011/0091219 A1 | 4/2011 | Tatum et al. | |
| 2011/0111642 A1 | 5/2011 | Sloey et al. | |
| 2012/0008903 A1 | 1/2012 | Obara et al. | |
| 2012/0044985 A1 | 2/2012 | Tao et al. | |
| 2012/0141132 A1 | 6/2012 | Walker | |
| 2012/0249871 A1 | 10/2012 | Nguyen et al. | |
| 2013/0077640 A1 | 3/2013 | Jiang | |
| 2013/0109317 A1 | 5/2013 | Kikuchi et al. | |
| 2013/0147520 A1 | 6/2013 | Payne | |
| 2013/0243437 A1 | 9/2013 | Kishima et al. | |
| 2014/0070907 A1 | 3/2014 | Boggan | |
| 2014/0186023 A1 | 7/2014 | Louderback | |
| 2014/0346325 A1 | 11/2014 | Frank | |
| 2015/0010311 A1 | 1/2015 | Parekh | |
| 2015/0110499 A1 | 4/2015 | Jiang et al. | |
| 2015/0149678 A1 * | 5/2015 | Kim | H04L 25/0292 |
| | | | 710/302 |
| 2015/0171561 A1 | 6/2015 | Little et al. | |
| 2015/0256227 A1 | 9/2015 | Teggatz | |
| 2015/0295647 A1 | 10/2015 | Parekh et al. | |
| 2016/0079714 A1 | 3/2016 | Wu et al. | |
| 2016/0099651 A1 | 4/2016 | Ishigaki | |
| 2016/0190997 A1 | 6/2016 | Tanimoto | |
| 2016/0240982 A1 | 8/2016 | Ohkubo et al. | |
| 2017/0054501 A9 | 2/2017 | Jiang et al. | |
| 2017/0116150 A1 | 4/2017 | Wiley | |
| 2018/0034618 A1 | 2/2018 | Rawi et al. | |
| 2018/0101156 A1 | 4/2018 | Kumar | |
| 2018/0102848 A1 | 4/2018 | Sabat, Jr. et al. | |
| 2018/0170203 A1 | 6/2018 | Jang | |
| 2018/0269990 A1 | 9/2018 | Muth et al. | |
| 2018/0309443 A1 | 10/2018 | Calabrese | |
| 2018/0343763 A1 | 11/2018 | Kumar et al. | |
| 2018/0371898 A1 | 12/2018 | Veeravalli et al. | |
| 2019/0012275 A1 | 1/2019 | Corbin et al. | |
| 2019/0097736 A1 | 3/2019 | Ho et al. | |
| 2019/0287549 A1 | 9/2019 | Poulsen | |

FOREIGN PATENT DOCUMENTS

| | | |
|---|---|---|
| EP | 1978656 A1 | 10/2008 |
| JP | 2009055306 A | 12/2009 |
| JP | 2011244179 A | 12/2011 |
| WO | 2008119669 A1 | 10/2008 |
| WO | 2012059071 A1 | 5/2012 |

OTHER PUBLICATIONS

International Preliminary Report on Patentability for International Application No. PCT/US2012/057520 dated Apr. 1, 2014, 13 pages.

(56) References Cited

OTHER PUBLICATIONS

International Search Report and Written Opinion for International Application No. PCT/US2014/045310 dated Nov. 5, 2014, 13 pages.
Translation of Chinese Office Action dated Oct. 28, 2016 for Chinese Application No. 201480038089.9 dated Oct. 28, 2016, 9 pages.
http://www.ophit.com/products/product_view.asp?boardid=1&num=6&ptitle=DVI%20fiber%20optic%20cable%20:%20DDI, downloaded Nov. 1, 2017.
https://web.archive.org/web/20080611135155/http://www.ophit.com/html/main02-01-05.asp, downloaded Nov. 1, 2017.
Japanese Office Action for Japanese Application No. 2016-524354 dated Mar. 28, 2018, 8 pages.
International Search Report an Written Opinion for International Application No. PCT/US2019/026858, dated Jun. 27, 2019, 12 pages.
SealSo Ruggedized Single Port Inline USB Isolator Cable—Sealevel, downloaded Aug. 31, 2020, 4 pages https://www.sealevel.com/product/iso-1r-seaiso-single-port-ruggedized-inline-usb-isolator-cable-ul-recognized/.
Acromag.com, downloaded Aug. 31, 2020, 3 pages, https://www.acromag.com/catalog/746/4-20ma-isolators-splitters/usb-isolators/usb-usb-isolators/compact-usb-isolators/usb.
JP 2016524354. Office Action (dated Oct. 1, 2018).
PCT/US2021/108348. Search Report-Written Opinion (dated May 5, 2021).
IEEE 802.3 "Call For Interest". Automotive Optical Multi Gig, Consensus presentation (dated Jul. 2019).

* cited by examiner

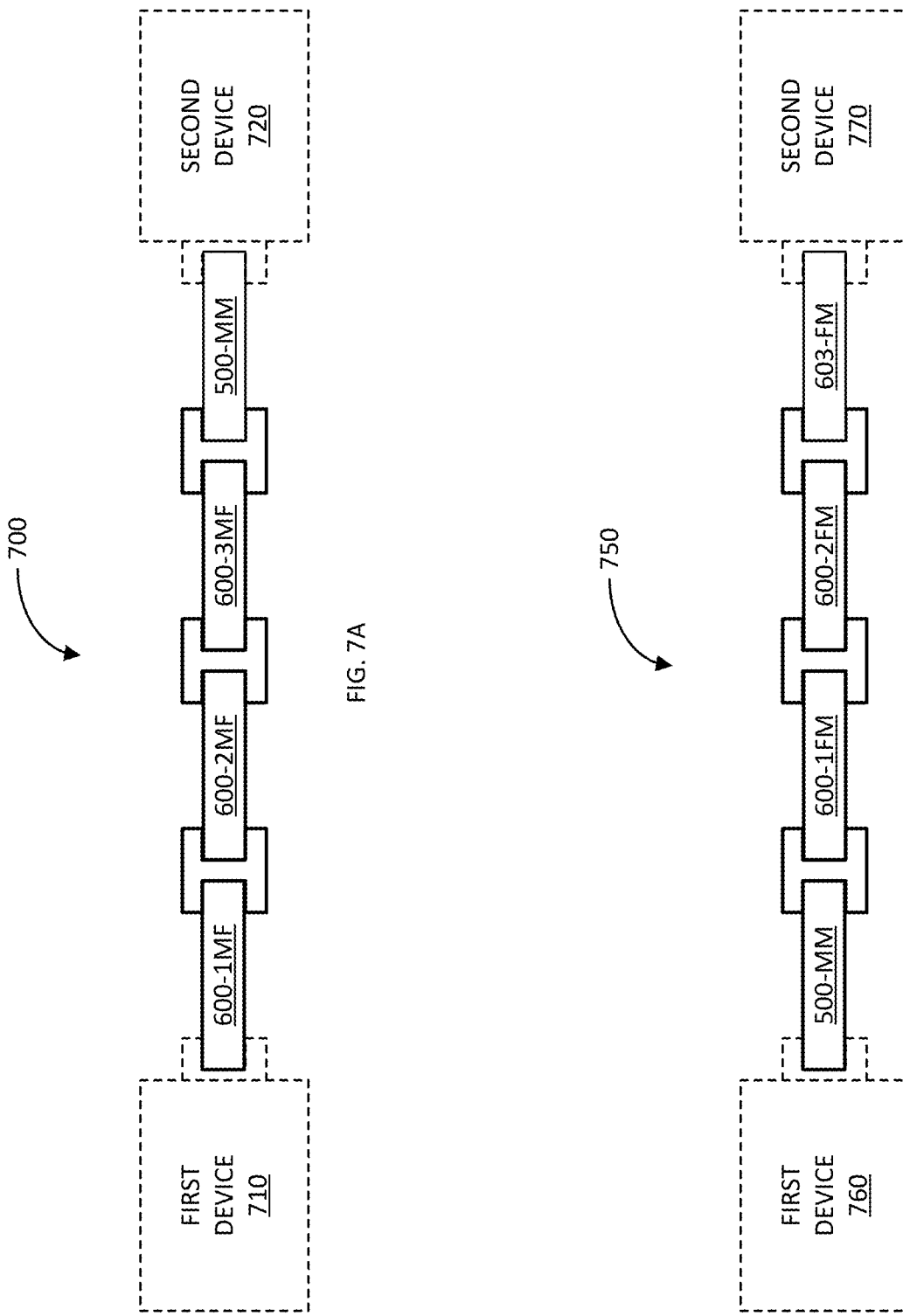

CASCADABLE DATA COMMUNICATION CABLE ASSEMBLY

CROSS-REFERENCE TO RELATED APPLICATIONS

This application is related to non-provisional patent applications entitled, "EXTENDABLE WIRE-BASED DATA COMMUNICATION CABLE ASSEMBLY" and "EXTENDABLE OPTICAL-BASED DATA COMMUNICATION CABLE ASSEMBLY" filed concurrently herewith, which are incorporated herein by reference.

FIELD

Aspects of the present disclosure relate generally to data communication cables, and in particular, to various extendable data communications cable assemblies.

BACKGROUND

A data communication cable is often used to communicate data signals between a first device and a second device in a unidirectional or bidirectional manner. Examples of such data communication cables include Universal Serial Bus (USB) cables, High-Definition Multimedia Interface (HDMI) cables, DisplayPort cables, Digital Video Interface (DVI) cables, and others.

In the past, these types of data communication cables were made out of passive components, such as electrical wire mediums. However, high speed data signals typically degrade when they travel long distances over electrical wire mediums. For instance, as the cable length increases, the likelihood of errors in the transmission increases. This degradation worsens with higher signal bandwidth, e.g., ultra-fast communication protocols trend towards shorter cable lengths. For example, the USB 2.0 protocol, which operates up to 480 Mbps, is practically limited to cable lengths of five (5) meters or less due to signal attenuation and distortion over passive electrical wire mediums.

This limitation in cable length restricts the placement of electronic devices in homes, offices, commercial or industrial setting. Users may wish to have additional freedom in connecting their electronics in any way they desire. Factors, such as architectural layout or ergonomics, can limit electronic device placement, such that traditional cable lengths make their connection unattainable.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An aspect of the disclosure relates to a data communication cable assembly including a first connector configured to mate with a connector of a first device; a second connector configured to mate with a connector of a second device; a cable including opposite ends securely attached to the first and second connectors, respectively, wherein the cable comprises one or more electrical wire mediums configured to transmit a data signal between the first and second devices; and a signal extender configured to modify the data signal to improve the transmission of the data signal between the first and second devices.

Another aspect of the disclosure relates to a data communication cable assembly including a first connector configured to mate with a connector of a first device; a second connector configured to mate with a connector of a second device; and a cable including opposite ends securely attached to the first and second connectors, respectively, wherein the cable comprises one or more optical transmission mediums configured to transmit an optical downlink data signal from the first device to the second device, and an optical uplink data signal from the second device to the first device.

Another aspect of the disclosure includes a data communication cable assembly, including a first connector configured to mate with a connector of a first device; a second connector configured to mate with a connector of another data communication cable assembly; and a cable including opposite ends securely attached to the first and second connectors, respectively, wherein the cable comprises one or more data transmission mediums configured to transmit one or more data signals between the first and second connectors.

Another aspect of the disclosure relates to a first data communication cable assembly, including a first connector configured to mate with a connector of a second data communication cable assembly for data coupling to a first device; a second connector configured to mate with a connector of a third data communication cable assembly for data coupling to a third device; and a cable including opposite ends securely attached to the first and second connectors, respectively, wherein the cable comprises one or more optical transmission mediums configured to transmit one or more data signals between the first and second connectors.

Another aspect of the disclosure relates to a data communication cable assembly, including a first connector configured to mate with a connector of another data communication cable assembly for data coupling to a first device; a second connector configured to mate with a connector of a second device; and a cable including opposite ends securely attached to the first and second connectors, respectively, wherein the cable comprises one or more data transmission mediums configured to transmit one or more data signals between the first and second connectors.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

BRIEF DESCRIPTION OF THE DRAWINGS

FIG. 7A illustrates a block/schematic diagram of another exemplary data communication system including a set of data communication assemblies cascaded together to communicatively couple a pair of devices in accordance with another aspect of the disclosure.

FIG. 7B illustrates a block/schematic diagram of another exemplary data communication system including a set of data communication assemblies cascaded together to communicatively couple a pair of devices in accordance with another aspect of the disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1A:
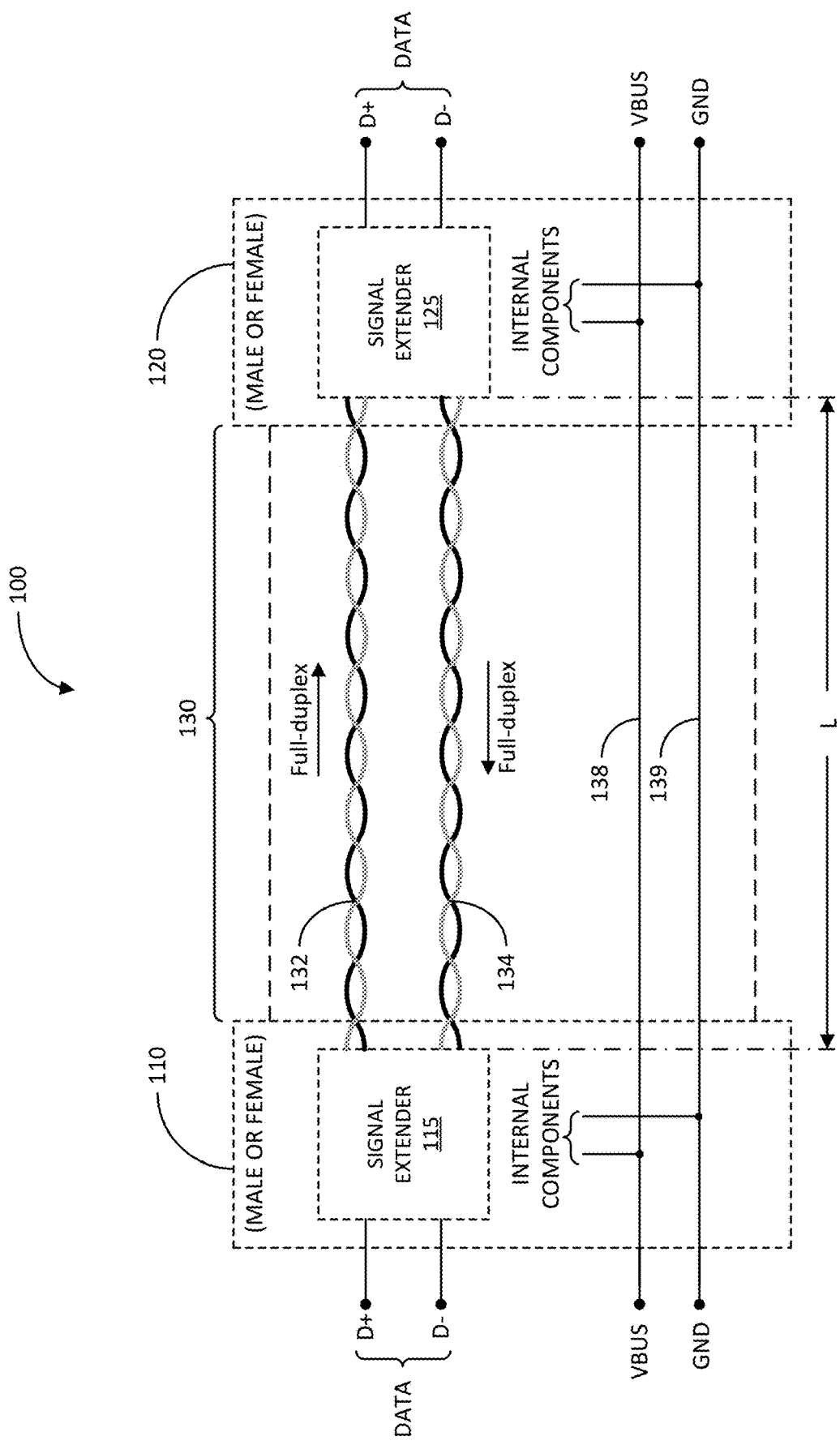
FIG. 1A illustrates a block/schematic diagram of an exemplary data communication cable assembly configured for full-duplex data transmission over twisted-wire electrical wire mediums in accordance with an aspect of the disclosure.

FIG. 1A illustrates a block/schematic diagram of an exemplary data communication cable assembly 100 configured for full-duplex data transmission over electrical wire mediums in accordance with an aspect of the disclosure. The data communication cable 100, as well as all others described herein, may be used for any type of data communication application. In the example described herein, a Universal Serial Bus (USB) compliant cable is used to exemplify the cable concepts. However, it shall be understood that the data communication cable assembly 100 may be configured for other types of data transmission, such as those compliant with High Definition Multimedia Interface (HDMI), DisplayPort, Digital Video Interface (DVI), and others.

In particular, the data communication cable assembly 100 includes a first connector 110, a cable 130, and a second connector 120. The cable 130 is securely attached to the first and second connectors 110 and 120 at opposite ends, respectively. The first connector 110 may be configured to mate with a connector of a first device (not shown), which, in the case of USB, may be a host device. The second connector 120 may be configured to mate with a connector of a second device (not shown), which, in the case of USB, may be a peripheral device. Typically, the first and second connectors 110 and 120 may each be configured as a same mating type (male or female) connector, and the corresponding connectors on the first and second devices may each be configured as the opposite mating type (female or male) connector, respectively.

The first connector 110 includes a first signal extender 115 configured to send and/or receive a differential data signal D+/D− to and/or from the first device. In the case where the first signal extender 115 is receiving a downlink (host-to-peripheral) differential data signal D+/D− from the first device, the first signal extender 115 may amplify, channel filter, and/or pre-emphasize the data signal. By pre-emphasizing, the first signal extender 115 may increase the slew rate of the data signal transitions, and/or sharpen or alter the transitions, such as by adding undershoots proximate rising transitions and/or overshoots proximate falling transitions, respectively. The signal extender 115 sends the processed downlink differential data signal to the second device via a twisted-wire pair 132 of the cable 130 and the second connector 120. Such amplification, pre-emphasis, and/or channel filtering of the downlink differential data signal D+/D− may be based on a length L of the twisted-wire pair 132.

In the case where the first signal extender 115 receives an uplink (peripheral-to-host) differential data D+/D− from the second device via the second connector 120 and a twisted-wire pair 134 of the cable 130, the first signal extender 115 may amplify, equalize, perform clock and data recovery (CDR), perform forward error correction (FEC), and/or buffer the data based on the received uplink differential data signal D+/D−. For example, the first signal extender 115 may include a variable gain amplifier (VGA), a continuous time linear equalizer (CTLE) and/or a decision feedback equalizer (DFE), a clock and data recovery (CDR) component, an FEC component, and a data buffer. Such amplification and equalizing of the uplink differential data signal D+/D− may be based on a length L of the twisted-wire pair 134. The first signal extender 115 may also operate as an arbiter to arbitrate between receiving downlink differential data signal D+/D− from the first device and sending uplink differential data signal D+/D− to the first device.

In the case of a USB-compliant cable, the first connector 110 may also send or receive a power signal, such as VBUS and ground (GND), to or from the first device. The power signal (VBUS/GND) may be used to provide power to internal components of the data communication cable assembly 100, such as the first signal extender 115. The power signal (VBUS/GND) may be sent to or received from the second connector 120 via electrical wires 138 and 139 of the cable 130, respectively.

The second connector 120 includes a second signal extender 125 configured to send and/or receive a differential data signal D+/D− to and/or from the second device. In the case where the second signal extender 125 is receiving an uplink differential data signal D+/D− from the second device, the second signal extender 125 may amplify, channel filter, and/or pre-emphasize the data signal. By pre-emphasizing, the second signal extender 125 may increase the slew rate of the data signal transitions, and/or sharpen or alter the transitions, such as by adding undershoots proximate rising transitions and/or overshoots proximate falling transitions, respectively. Such amplification, pre-emphasis, and/or channel filtering of the uplink differential data signal D+/D− may be based on a length L of the twisted-wire pair 134.

In the case where the second signal extender 125 receives a downlink differential data D+/D− from the first device via the twisted-wire pair 132 of the cable 130, the second signal extender 125 may amplify, equalize, perform clock and data recovery (CDR), perform forward error correction (FEC), and data buffering based on the received downlink differential data signal D+/D−. For example, the second signal extender 125 may include a VGA, a CTLE and/or a DFE, a CDR, FEC, and/or data buffer. Such amplification and equalizing of the downlink differential data signal D+/D− may be based on a length L of the twisted-wire pair 132. The second signal extender 125 also operates as an arbiter to arbitrate between sending the downlink differential data signal D+/D− to the second device and receiving the uplink differential data signal D+/D− from the second device.

In the case of a USB-compliant cable, the second connector 120 may also send or receive the power signal, such as VBUS and ground (GND), to or from the second device. The power signal (VBUS/GND) may be used to provide power to internal components of the data communication cable assembly 100, such as the second signal extender 125. The power signal (VBUS/GND) may be sent to or received from the first connector 110 via the electrical wires 138 and 139 of the cable 130, respectively.

The first and second signal extenders 115 and 125 allow the data communication cable assembly 100 to be made significantly longer because it compensates for data signal attenuation and distortion due to propagation via the electrical wire mediums 132 and 134. This facilitates placement of electronic devices in homes, offices, commercial or industrial setting with more flexibility as the data communication cable assembly 100 may have sufficient length to accommodate the placement of such devices.

Figure 1B:
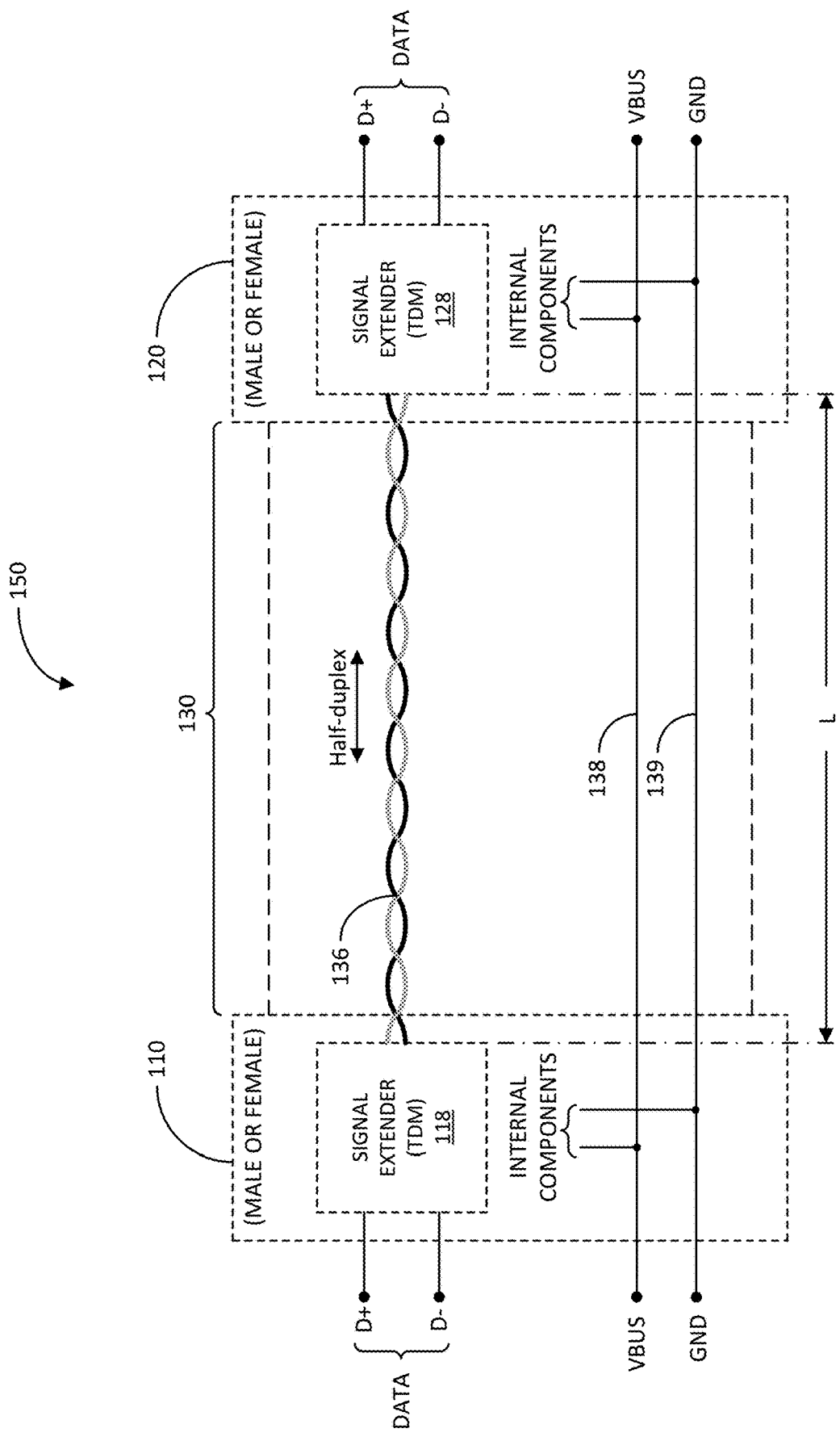
FIG. 1B illustrates a block/schematic diagram of another exemplary data communication cable assembly configured for half-duplex, time-division multiplexing (TDM) data transmission over at least one twisted-wire electrical wire medium in accordance with another aspect of the disclosure.

FIG. 1B illustrates a block/schematic diagram of another exemplary data communication cable assembly 150 configured for half-duplex data transmission over at least one electrical wire medium in accordance with another aspect of the disclosure. The data communication cable assembly 150 is similar to that of data communication cable assembly 100, and includes many similar elements as indicated by the same reference numbers. The data communication cable assembly 150 differs from data communication cable assembly 100 in that cable assembly 150 is configured for half-duplex, time division multiplexing (TDM) data transmission over a twisted wire pair. Accordingly, the focus of the following discussion of data communication cable assembly 150 is the difference between cable assembly 150 and cable assembly 100.

In particular, the first connector 110 includes a first signal extender 118 configured to receive a downlink differential data signal D+/D− from the first device, and process the signal for transmission to the second device via a twisted-wire pair 136 of the cable 130 and the second connector 120. The processing of the downlink differential data signal D+/D− by the first signal extender 118 is similar to that of the first signal extender 115 previously discussed, e.g., data buffering, signal amplification, channel filtering and/or pre-emphasis, which may be based on a length L of a twisted-wire pair 136 of the cable 130. The first signal extender 118 is also configured to receive an uplink differential data signal D+/D− from the second device via the second connector 120 and the twisted-wire pair 136 for sending to the first device. Similarly, the processing of the uplink differential data signal D+/D− by the first signal extender 118 is similar to that of the first signal extender 115 previously discussed, e.g., signal amplification, equalization, CDR, FEC, and/or data buffering, which may be based on the length L of the twisted-wire pair 136 of the cable 130.

However, in this case, the first signal extender 118 transmits and receives the downlink and uplink differential data signals D+/D− via the twisted-wire pair 136 in a time division multiplexed (TDM) manner, respectively. That is, within a first time interval, the first signal extender 118 transmits the downlink differential data signal D+/D− via the twisted-wire pair 136, and within a second time interval (substantially non-overlapping with the first time interval), the first signal extender 118 receives the uplink differential data signal D+/D− via the twisted-wire pair 136.

Similarly, the second connector 120 includes a second signal extender 128 configured to receive the downlink differential data signal D+/D− from the first device via the first connector 110 and the twisted-wire pair 136 of the cable 130, and process the signal for transmission to the second device. The processing of the differential data signal D+/D− by the second signal extender 128 is similar to that of the second signal extender 125 previously discussed, e.g., signal amplification, equalization, CDR, FEC, and/or data buffering, which may be based on the length L of the twisted-wire pair 136 of the cable 130. The second signal extender 128 is also configured to receive the uplink differential data signal D+/D− from the second device. Similarly, the processing of the uplink differential data signal D+/D− by the second signal extender 128 is similar to that of the second signal extender 125 previously discussed, e.g., data buffering, signal amplification, channel filtering and/or pre-emphasis, which may be based on the length L of the twisted-wire pair 136 of the cable 130.

However, in this case, the second signal extender 128 transmits and receives the uplink and downlink differential data signals D+/D− via the twisted-wire pair 136 in a time division multiplexed (TDM) manner, respectively. That is, within a first time interval, the second signal extender 128 transmits the uplink differential data signal D+/D− via the twisted-wire pair 136, and within a second time interval (substantially non-overlapping with the first time interval), the second signal extender 128 receives the downlink differential data signal D+/D− via the twisted-wire pair 136.

Figure 2A:
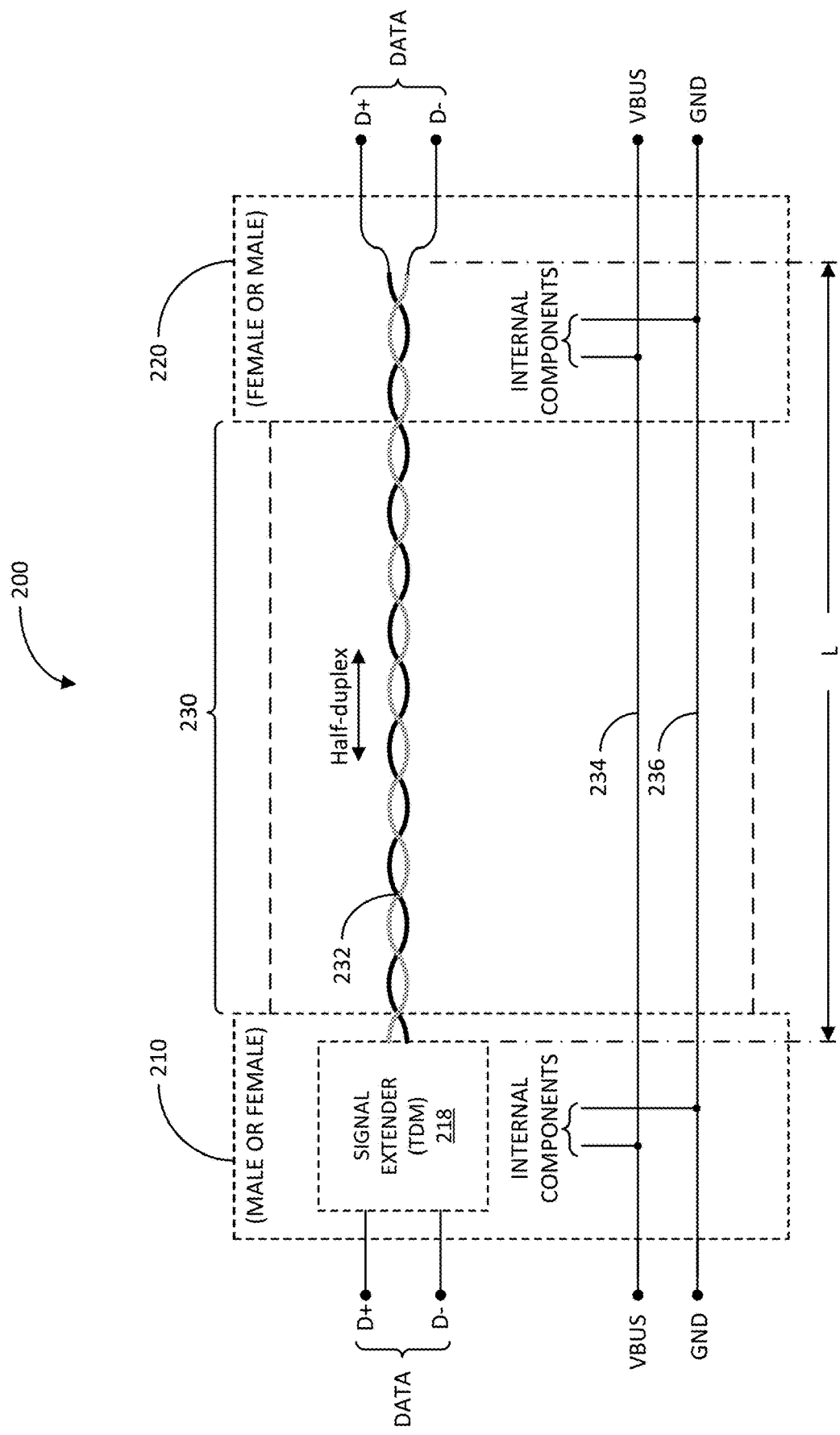
FIG. 2A illustrates a block/schematic diagram of an exemplary host-side cascadable data communication cable assembly configured for data transmission over at least one twisted-wire electrical wire medium in accordance with another aspect of the disclosure.

FIG. 2A illustrates a block/schematic diagram of an exemplary host-side cascadable data communication cable assembly 200 configured for data transmission over at least one twisted-wire electrical wire medium in accordance with another aspect of the disclosure. The data communication cable assembly 200 is similar to that of cable assembly 150 including a first connector 210, second connector 220, and cable 230 securely attached at opposite ends to the first and second connectors 210 and 220, respectively.

Additionally, the first connector 210 of the data communication cable assembly 200 includes a signal extender (TDM) 218 which, in this example, is configured to TDM half-duplex data transmission, but may alternatively be configured for full-duplex data transmission as per signal extender 115. The signal extender (TDM) 218 may process the data signals based on a length L of a twisted-wire pair 232 of the cable 230, as previously discussed. Further, the data communication cable assembly 200 includes electrical conductors in the first connector 210, electrical wire mediums 234 and 236 in the cable 230, and electrical conductors in the second connector 220 for transmitting the power signal (VBUS/GND) between the first and second connectors 210 and 220, and to components within the cable assembly 200.

The cascadable data communication cable assembly 200 differs from data communication cable 150 in that the twisted-wire pair 232 that extends through the cable 230 and substantially through the second connector 220 up to the electrical contacts for electrical coupling with electrical contacts of another cable assembly to which it connects. Thus, the second connector 220 may not include a signal extender, such as signal extender 128 or 125. The second connector 220 may be of the opposite mating type (female or male) as that of (male or female) of the first connector 210. This allows the second connector 220 to mate with a connector of the following cable assembly in the downlink direction.

Figure 2B:
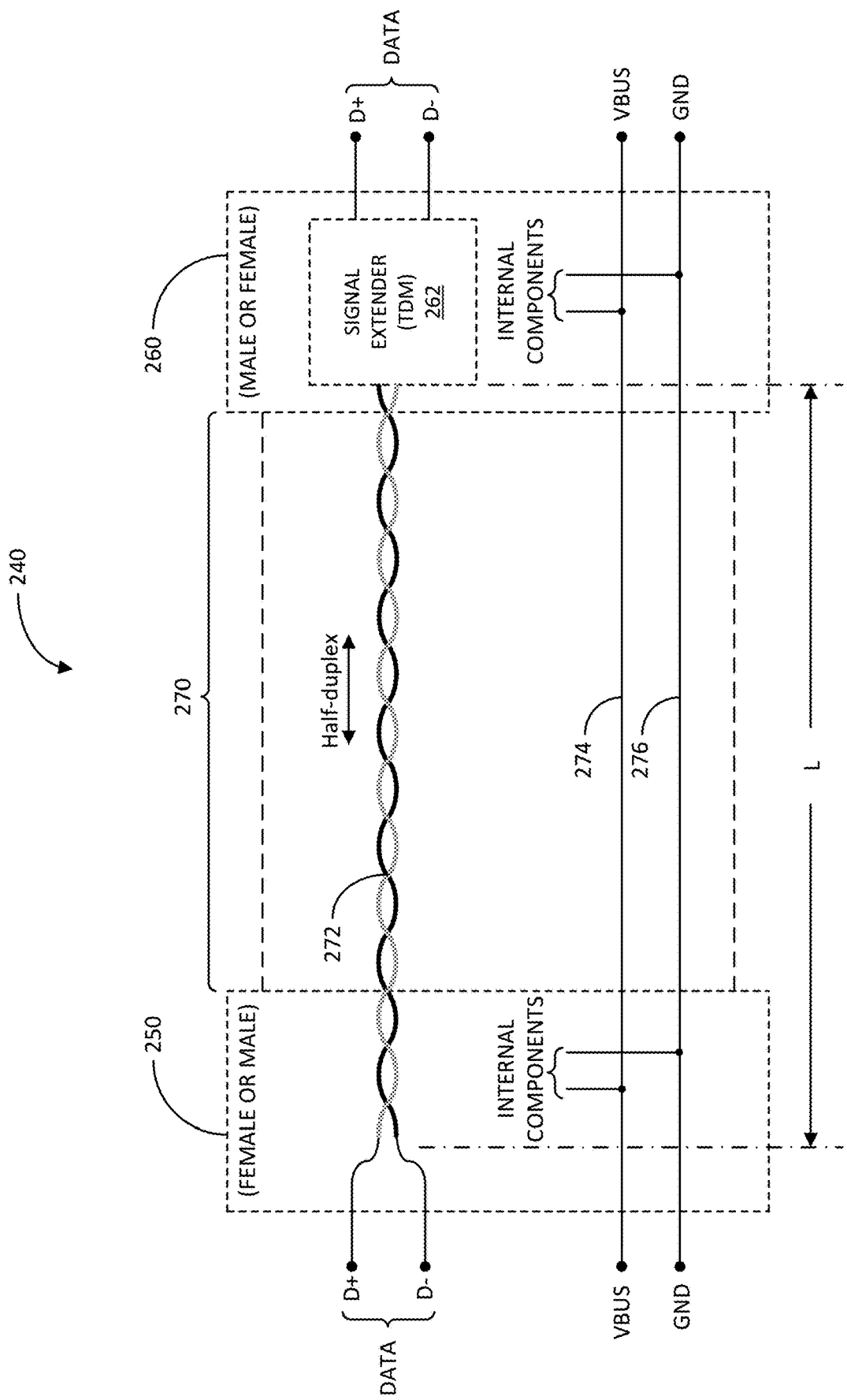
FIG. 2B illustrates a block/schematic diagram of an exemplary peripheral-side cascadable data communication cable assembly configured for data transmission over at least one twisted-wire electrical wire medium in accordance with another aspect of the disclosure.

FIG. 2B illustrates a block/schematic diagram of an exemplary host-side cascadable data communication cable assembly 240 configured for data transmission over at least one twisted-wire electrical wire medium in accordance with another aspect of the disclosure. The data communication cable assembly 240 is similar to that of cable assembly 150 including a first connector 250, second connector 260, and cable 270 securely attached at opposite ends to the first and second connectors 250 and 260, respectively.

Additionally, the second connector 260 of the data communication cable assembly 240 includes a signal extender (TDM) 262 which, in this example, is configured to TDM half-duplex data transmission, but may alternatively be configured for full-duplex data transmission as per signal extender 215. The signal extender (TDM) 262 may process the data signals based on a length L of a twisted-wire pair 272 of the cable 230, as previously discussed. Further, the data communication cable assembly 240 includes electrical conductors in the first connector 250, electrical wire mediums 274 and 276 in the cable 270, and electrical conductors in the second connector 260 for transmitting the power signal (VBUS/GND) between the first and second connectors 250 and 270, and to components within the cable assembly 240.

The cascadable data communication cable assembly 240 differs from data communication cable 150 in that the twisted-wire pair 272 extends substantially from the electrical contacts of the first connector 250 to the second connector 260 via the cable 270. Thus, the first connector 250 may not include a signal extender, such as signal extender 118 or 115. The first connector 250 may be of the opposite mating type (female or male) as that of (male or female) of the second connector 260. This allows the first connector 250 to mate with a connector of cable assembly to which it connects in the downlink direction.

Figure 2C:
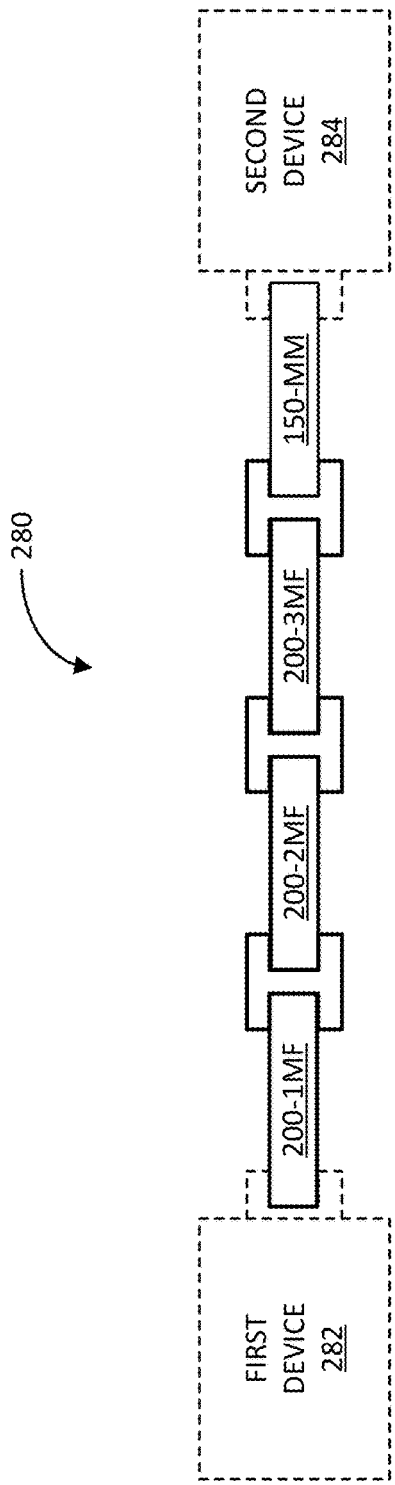
FIG. 2C illustrates a block/schematic diagram of an exemplary data communication system including a set of data communication assemblies cascaded together to communicatively couple a pair of devices in accordance with another aspect of the disclosure.

FIG. 2C illustrates a block/schematic diagram of an exemplary data communication system 280 in accordance with another aspect of the disclosure. The data communication system 280 includes a first device 282, which, in the case of a USB-compliant system, may be a host device. The data communication system 280 includes a second device 284, which, in the case of a USB-compliant system, may be a peripheral device. The data communication system 280 further includes a set of data communication cable assemblies 200-1MF, 200-2MF, 200-3MF, and 150-MM cascaded or daisy-chained together to data couple the first device 282 to the second device 284.

More specifically, the data communication cable assemblies 200-1MF, 200-2MF, and 200-3MF may each be configured similar to data communication cable assembly 200 with the first connector 210 being a male connector and the second connector 220 being a female connector. Accordingly, the cable assembly 200-1MF has a first male connector mated with a female connector of the first device 282, and a second female connector mated to a first male connector of the cable assembly 200-2MF.

The cable assembly 200-2MF has a second female connector mated with a first male connector of the cable assembly 200-3MF. The cable assembly 200-3MF has a second female connector mated with a first male connector of the cable assembly 150-MM. The data communication cable assembly 150-MM is similar to data communication cable assembly 150 (or 100 in the full-duplex case) with the first and second connectors both being male connectors.

Accordingly, the second male connector of the cable assembly 150-MM is mated with the female connector of the second device 284.

Figure 2D:
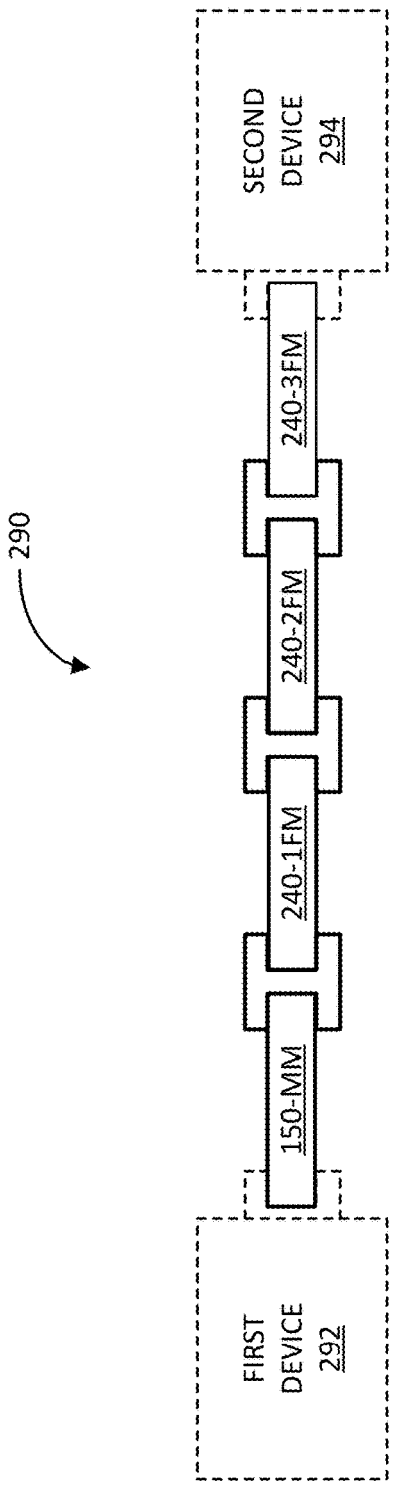
FIG. 2D illustrates a block/schematic diagram of another exemplary data communication system including a set of data communication assemblies cascaded together to communicatively couple a pair of devices in accordance with another aspect of the disclosure.

FIG. 2D illustrates a block/schematic diagram of another exemplary data communication system 290 in accordance with another aspect of the disclosure. The data communication system 290 includes a first device 292, which, in the case of a USB-compliant system, may be a host device. The data communication system 290 includes a second device 294, which, in the case of a USB-compliant system, may be a peripheral device. The data communication cable 290 further includes a set of data communication cable assemblies 150-MM, 240-1FM, 240-2FM, and 240-3FM cascaded or daisy-chained together to data couple the first device 292 to the second device 294.

More specifically, the data communication cable assemblies 240-1FM, 240-2FM, and 240-3FM may each be configured similar to data communication cable assembly 240 with the first connector 250 being a female connector and the second connector 260 being a male connector. The data communication cable assembly 150-MM is similar to data communication cable assembly 150 (or 100 in the full-duplex case) with the first and second connectors both being male connectors.

Accordingly, the cable assembly 150-MM has a first male connector mated with a female connector of the first device 292, and a second male connector mated to a first female connector of the cable assembly 240-1FM. The cable assembly 240-1FM has a second male connector mated with a first female connector of the cable assembly 240-2FM. The cable assembly 240-2FM has a second male connector mated with a first female connector of the cable assembly 240-3FM. The data communication cable assembly 240-3FM has a second male connector mated with the female connector of the second device 294.

Figure 3A:
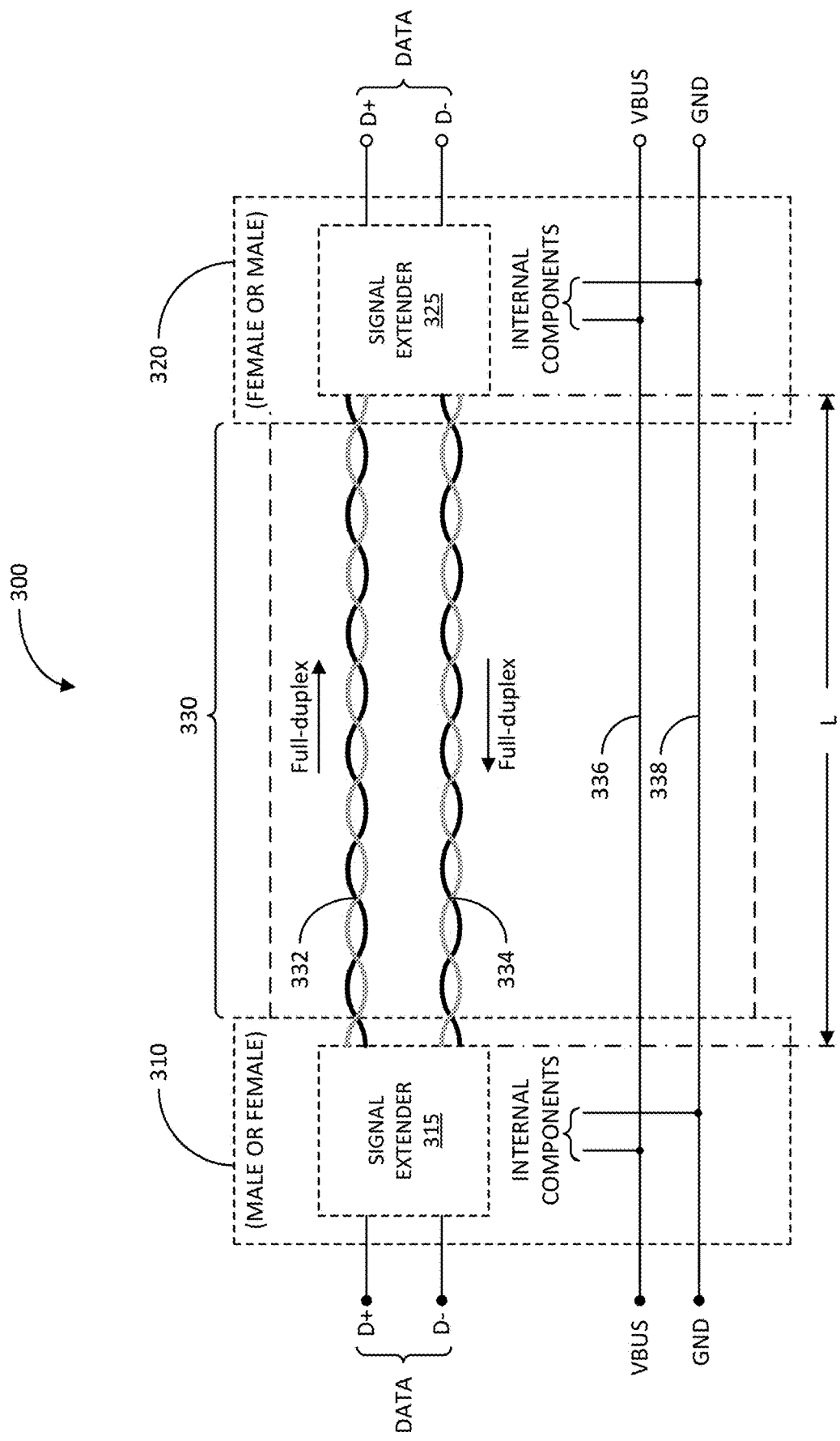
FIG. 3A illustrates a block/schematic diagram of an exemplary cascadable data communication cable assembly configured for data transmission over at least one twisted-wire electrical wire medium in accordance with another aspect of the disclosure.

FIG. 3A illustrates a block/schematic diagram of an exemplary cascadable data communication cable assembly 300 including a twisted-wire pair electrical mediums in accordance with another aspect of the disclosure. The cascadable data communication cable assembly 300 is similar to that of data communication cable assembly 100 with similar elements identified by the same reference numbers except the most significant digital (MSD) in the case of cable assembly 300 is a "3" instead of a "1". However, it shall be understood that the cascadable data communication cable assembly 300 may be configured similar to the half-duplex version cable assembly 150.

Thus, the cascadable data communication cable assembly 300 includes a first connector 310 with a signal extender 315, a cable 330 with one or more twisted-wire pairs 332 and 334, and a second connector 320 with a second signal extender 325. The data communication cable assembly 300 further includes power signal (VBUS, GND) electrical conductors in the first connector 310, electrical wires 336 and 338 in the cable 330, and electrical conductors in the second connector 320.

The cascadable communication cable assembly 300 differs from data communication cable 100 in that the second connector 320 is of the opposite mating type (female or male) as that of the first connector 310. This feature allows a set of two or more cable assemblies 300 to be cascaded or daisy-chained to form a longer length cable. Such as by connecting the second connector of one of the cables to the first connector of the cascaded or following/preceded cable, and so on. An example of a data communication system with a set of cascaded data communication cable assemblies is described below.

Figure 3B:
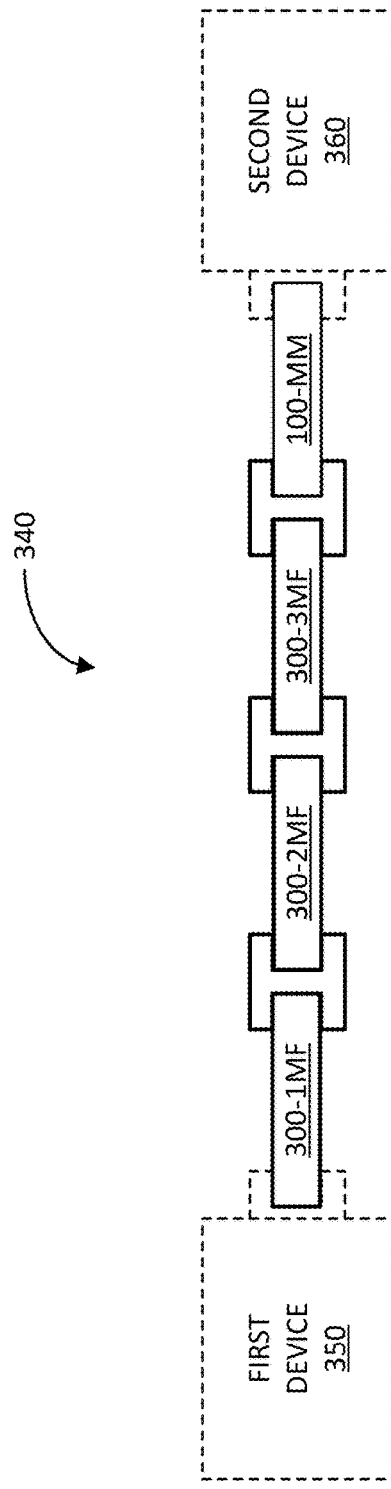
FIG. 3B illustrates a block/schematic diagram of another exemplary data communication system including a set of data communication assemblies cascaded together to communicatively couple a pair of devices in accordance with another aspect of the disclosure.

FIG. 3B illustrates a block diagram of an exemplary data communication system 340 including a set of cascaded data communication cable assemblies in accordance with another aspect of the disclosure. The data communication system 340 includes a first device 350. In the case of a USB-compliant system 340, the first device 350 may be a host device.

The data communication system 340 further includes two or more data communication cable assemblies 300-1MF, 300-2MF, and 300-3MF (e.g., three, but could be any number) cascaded or daisy-chained together to form a longer cable. The data communication cable assembly 300-1MF includes a first male connector mated with a female connector of the first device 350. The data communication cable assembly 300-2MF has a first male connector mated with a second female connector of data communication cable assembly 300-1MF. The data communication cable assembly 300-3MF has a first male connector mated with a second female connector of data communication cable assembly 300-2MF. As the data communication cable assembly 300-3MF has a second female connector, it may not be able to mate with the female connector of a second device 360. In the case of a USB-compliant system 340, the second device 360 may be a peripheral device.

Accordingly, the data communication system 340 includes a data communication cable assembly 100-MM that includes first and second male connectors. This allows the data communication cable assembly 100 to mate with the female connector of the data communication cable assembly 300-3MF and the female connector of the second device 360. Thus, the cables 300-1MF, 300-2MF, 300-3MF, and 100-MM may be cascadable or daisy-chained to form longer length cables in order to meet the distance requirements for desirably-placed devices. As the cables 300-1MF, 300-2MF, 300-3MF, and 100-MM include signal extenders, the differential data signal communicated between the first and second devices 350 and 360 may be successfully transmitted and recovered.

Figure 3C:
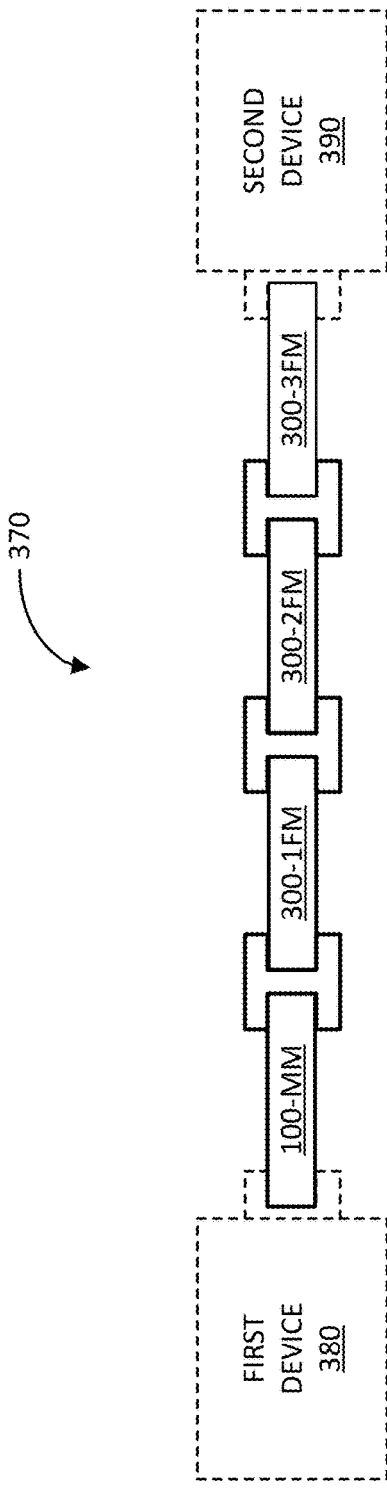
FIG. 3C illustrates a block/schematic diagram of another exemplary data communication system including a set of data communication assemblies cascaded together to communicatively couple a pair of devices in accordance with another aspect of the disclosure.

FIG. 3C illustrates a block diagram of an exemplary data communication system 370 including a set of cascaded data communication cable assemblies in accordance with another aspect of the disclosure. The data communication system 370 includes a first device 380. In the case of a USB-compliant system 370, the first device 380 may be a host device.

The data communication system 370 further includes two or more data communication cable assemblies 100-MM, 300-1FM, 300-2FM, and 300-3MF (e.g., three, but could be any number) cascaded or daisy-chained together to form a longer cable. The data communication cable assembly 100-MM includes a first male connector mated with a female connector of the first device 380. The data communication cable assembly 300-1FM includes a first female connector mated with a second male connector of data communication cable assembly 100-MM. The data communication cable assembly 300-2FM has a first female connector mated with a second male connector of data communication cable assembly 300-1FM. The data communication cable assembly 300-3FM has a first female connector mated with a second male connector of data communication cable assembly 300-2FM. The data communication cable assembly 300-3FM includes a second male connector mated with a female connector of the second device 390. In the case of a USB-compliant system 370, the second device 390 may be a peripheral device.

Thus, the cable assemblies 100-MM, 300-1FM, 300-2FM, and 300-3FM may be cascadable or daisy-chained to form longer length cables in order to meet the distance requirements for desirably-placed devices. As the cables 100-MM, 300-1FM, 300-2FM, and 300-3FM include signal extenders, the differential data signal communicated between the first and second devices 380 and 390 may be successfully transmitted and recovered.

Figure 4A:
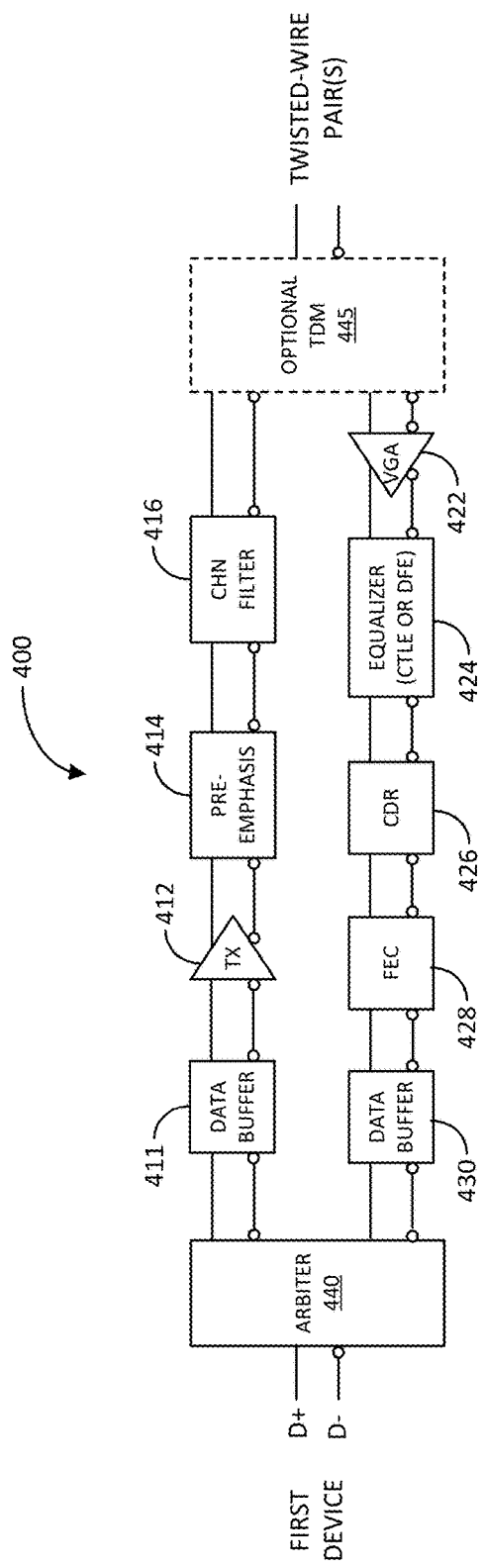
FIG. 4A illustrates a block diagram of an exemplary host-side signal extender of a data communication cable assembly in accordance with another aspect of the disclosure.

FIG. 4A illustrates a block/schematic diagram of an exemplary host signal extender 400 in accordance with another aspect of the disclosure. The host signal extender 400 is an exemplary detailed implementation of the signal extenders 115, 118, 218, and 315 previously discussed.

In particular, the host signal extender 400, on the transmitter-side, includes a data buffer 411, a transmit driver 412, a pre-emphasizer 414, and a channel filter 416. The data buffer 411 receives a downlink differential data signal from a first (host) device via an arbiter 440, and buffers the data if needed (e.g., because the corresponding twisted-wire pair is receiving a data signal at the same time). The transmit driver 412 amplifies the downlink differential data signal for compliant transmission via the twisted-wire pair(s). The pre-emphasizer 414 applies pre-emphasis to the data signal as previously discussed. The channel filter 416 filters the downlink differential data signal to remove noise and out-of-band unwanted signals. Because the twisted-wire pair(s) attenuate and distorts (e.g., reduces high frequency components of) the data signal based on the length of the twisted-wire pair(s), the amplification, pre-emphasis, and filtering may be based on the length of the twisted-wire pair.

In the case of a full-duplex transmission as per data communication cable assemblies 100 and 300, the output of the channel filter 416 may be coupled directly to the downlink twisted-wire pair. In the case of a half-duplex transmission as per data communication cable assemblies 150 and 200, the output of the channel filter 416 may be coupled to the downlink twisted-wire pair via a time-division multiplexer (TDM) 445.

The host signal extender 400, on the receiver-side, includes a variable gain amplifier (VGA) 422, an equalizer 424, a clock and data recovery (CDR) 426, a forward error correction (FEC) 428, and a data buffer 430. In the case of a full-duplex transmission as per data communication cable assemblies 100 and 300, the input of the VGA 422 may be coupled directly to the uplink twisted-wire pair. In the case of a half-duplex transmission as per data communication cable assemblies 150 and 200, the input of the VGA 422 may be coupled to the uplink twisted-wire pair via the TDM 445. The VGA 422 amplifies the received uplink differential data signal.

The equalizer 424, which may include a continuous time linear equalizer (CTLE) and/or a decision feedback equalizer (DFE), includes a frequency response to boost high frequency components of the uplink differential data signal to compensate for high frequency losses due to transmission via the uplink twisted-wire pair. The CDR 426 recovers the data and clock associated with the uplink differential data signal (e.g., performs signal retiming). The FEC 428 corrects error in the data that may have occurred in the uplink differential data signal. And, the data buffer 430 may buffer the uplink data if, for example, the arbiter 440 is busy providing the downlink data signal to the transmitter-side of the host signal extender 400. Because the twisted-wire pair(s) attenuate and distorts (e.g., reduces high frequency components of) the data signal based on the length of the twisted-wire pair(s), the amplification and equalization may be based on the length of the twisted-wire pair.

Figure 4B:
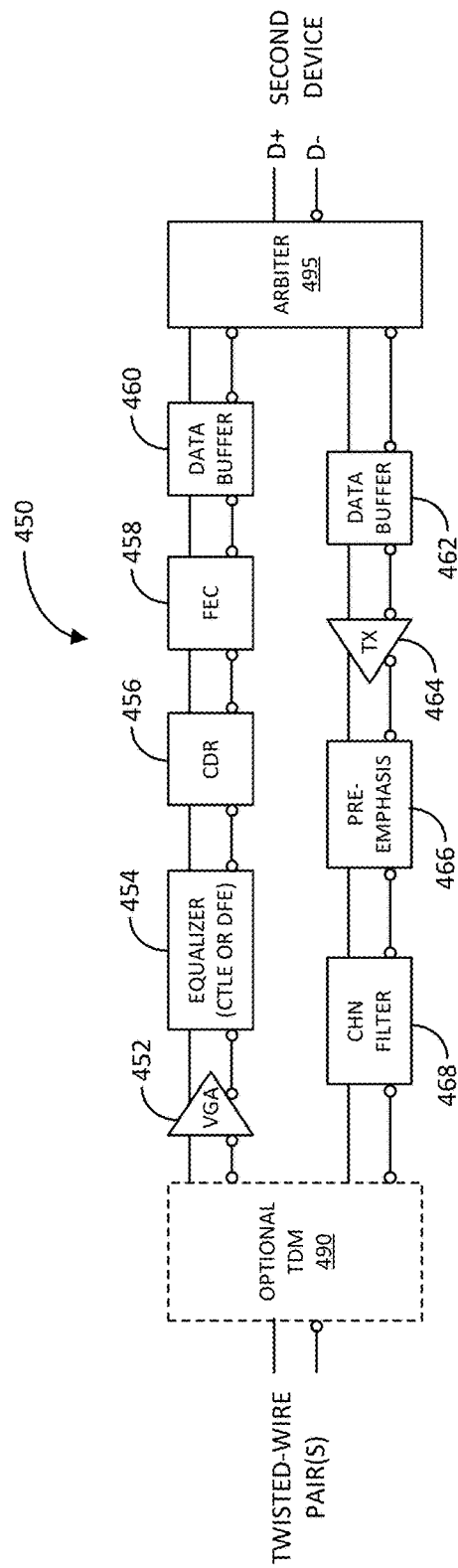
FIG. 4B illustrates a block diagram of an exemplary peripheral-side signal extender of a data communication cable assembly in accordance with another aspect of the disclosure.

FIG. 4B illustrates a block/schematic diagram of an exemplary peripheral signal extender 450 in accordance with another aspect of the disclosure. The peripheral signal extender 450 is an exemplary detailed implementation of the signal extenders 125, 128, 262, and 325 previously discussed.

In particular, the peripheral signal extender 450, on the transmitter-side, includes a data buffer 462, a transmit driver 464, a pre-emphasizer 466, and a channel filter 468. The data buffer 462 receives an uplink differential data signal from a second (peripheral) device via an arbiter 495, and buffers the data if needed (e.g., because the corresponding twisted-wire pair is receiving a data signal at the same time). The transmit driver 464 amplifies the uplink differential data signal for compliant transmission via the twisted-wire pair(s). The pre-emphasizer 466 applies pre-emphasis to the data signal as previously discussed. The channel filter 468 filters the uplink differential data signal to remove noise and out-of-band unwanted signals. Because the twisted-wire pair(s) attenuate and distorts (e.g., reduces high frequency components of) the data signal based on the length of the twisted-wire pair(s), the amplification, pre-emphasis, and filtering may be based on the length of the twisted-wire pair.

In the case of a full-duplex transmission as per data communication cable assemblies 100 and 300, the output of the channel filter 468 may be coupled directly to the uplink twisted-wire pair. In the case of a half-duplex transmission as per data communication cable assemblies 150 and 200, the output of the channel filter 468 may be coupled to the uplink twisted-wire pair via a time-division multiplexer (TDM) 490.

The peripheral signal extender 400, on the receiver-side, includes a variable gain amplifier (VGA) 452, an equalizer 454, a clock and data recovery (CDR) 456, a forward error correction (FEC) 458, and a data buffer 460. In the case of a full-duplex transmission as per data communication cable assemblies 100 and 300, the input of the VGA 452 may be coupled directly to the downlink twisted-wire pair. In the case of a half-duplex transmission as per data communication cable assemblies 150 and 200, the input of the VGA 452 may be coupled to the downlink twisted-wire pair via the TDM 490. The VGA 452 amplifies the received downlink differential data signal.

The equalizer 454, which may include a continuous time linear equalizer (CTLE) and/or a decision feedback equalizer (DFE), includes a frequency response to boost high frequency components of the downlink differential data signal to compensate for high frequency losses due to transmission via the downlink twisted-wire pair. The CDR 456 recovers the data and clock associated with the uplink differential data signal (e.g., performs signal retiming). The FEC 458 corrects error in the data that may have occurred in the uplink differential data signal. And, the data buffer 460 may buffer the downlink data if, for example, the arbiter 495 is busy providing the uplink data signal to the transmitter-side of the peripheral signal extender 450. Because the twisted-wire pair(s) attenuate and distorts (e.g., reduces high frequency components of) the data signal based on the length of the twisted-wire pair(s), the amplification and equalization may be based on the length of the twisted-wire pair.

Figure 5A:
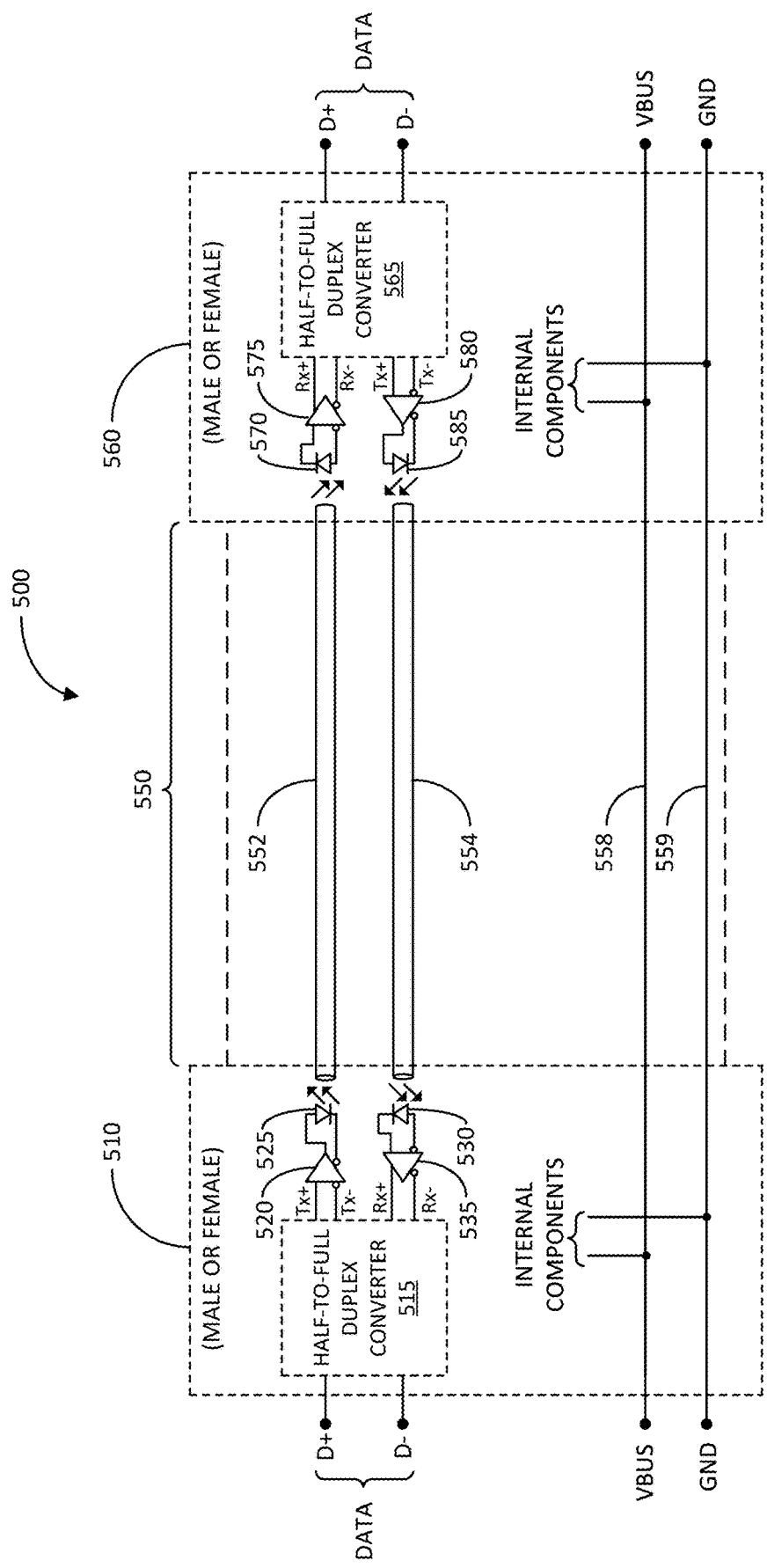
FIG. 5A illustrates a block/schematic diagram of another exemplary data communication cable assembly configured for full-duplex data transmission over optical mediums in accordance with another aspect of the disclosure.

FIG. 5A illustrates a block/schematic diagram of an exemplary data communication cable assembly 500 configured for full-duplex data transmission over optical mediums in accordance with an aspect of the disclosure. The data communication cable assembly 500 may be used for any type of data communication application. In the example described herein, a Universal Serial Bus (USB) compliant cable is used to exemplify the cable concepts. However, it shall be understood that the data communication cable assembly 500 may be configured for other types of data transmission, such as those compliant with High Definition Multimedia Interface (HDMI), DisplayPort, Digital Video Interface (DVI), and others.

In particular, the data communication cable assembly 500 includes a first connector 510, a cable 550, and a second connector 560. The cable 550 is securely attached to the first and second connectors 510 and 560 at opposite ends, respectively. The first connector 510 may be configured to mate with a connector of a first device (not shown), which, in the case of USB, may be a host device. The second connector 560 may be configured to mate with a connector of a second device (not shown), which, in the case of USB, may be a peripheral device. Typically, the first and second connectors 510 and 560 may each be configured as the same mating type (male or female) connector, and the corresponding connectors on the first and second devices may each be configured as the opposite mating type (female or male) connector, respectively.

The first connector 510 includes a first half-to-full duplex converter 515 configured to send and/or receive uplink and/or downlink differential data signal D+/D− to and/or from the first device in a half- or full-duplex manner. The first connector 510 further includes a laser diode driver (LDD) 520 configured to receive the downlink differential data signal Tx+/Tx−, and generate a drive signal for a laser diode (LD) 525. The LD 525, in turn, generates an optical downlink data signal modulated with the data signal for transmission to the second device via an optical transmission medium 552 (e.g., an optical fiber) and the second connector 560.

The first connector 510 further includes a photo diode or detector (PD) 530 configured to receive an uplink optical data signal modulated with a data signal originating from the second device via the second connector 560 and an optical transmission medium 554 (e.g., an optical fiber). The PD 530 converts the optical uplink data signal into a modulated current. The first connector 510 further includes a transimpedance amplifier (TIA) 535 configured to covert the modulated current into an uplink differential data voltage signal Rx+/Rx−. The half-to-full duplex converter 515 sends the uplink differential data voltage signal Rx+/Rx− as a compliant electrical uplink data signal D+/D− to the first device.

In the case of a USB-compliant cable, the first connector 510 may also send or receive a power signal, such as VBUS and ground (GND), to or from the first device. The power signal (VBUS/GND) may be used to provide power to internal components of the data communication cable 500, such as the first half-to-full duplex converter 515, the LDD 520, the LD 525, the PD 530, and the TIA 535. The power signal (VBUS/GND) may be sent to or received from the second connector 560 via electrical wires 558 and 559 of the cable 550, respectively.

The second connector 560 includes a second half-to-full duplex converter 565 configured to send and/or receive downlink and/or uplink differential data signal D+/D− to and/or from the second device in a half- or full-duplex manner. The second connector 560 further includes a photo diode or detector (PD) 570 configured to receive a downlink optical data signal modulated with a data signal originating from the first device via the first connector 510 and the optical transmission medium 552. The PD 570 converts the modulated optical signal into a modulated current. The second connector 560 further includes a transimpedance amplifier (TIA) 575 configured to covert the modulated current into a downlink differential data voltage signal Rx+/Rx−. The second half-to-full duplex converter 565 sends the downlink differential data voltage signal Rx+/Rx− as a compliant electrical downlink data signal D+/D− to the second device.

The second connector 560 further includes a laser diode driver (LDD) 580 configured to receive the electrical uplink data signal Tx+/Tx−, and generate a drive signal for a laser diode (LD) 585. The LD 585, in turn, generates an uplink optical data signal modulated with the data signal for transmission to the first device via the optical transmission medium 554 and the first connector 510.

In the case of a USB-compliant cable, the second connector 560 may also send or receive a power signal, such as VBUS and ground (GND), to or from the second device. The power signal (VBUS/GND) may be used to provide power to internal components of the data communication cable assembly 500, such as the second half-to-full duplex converter 565, the LDD 580, the LD 585, the PD 570, and the TIA 575. The power signal (VBUS/GND) may be sent to or received from the first connector 510 via the electrical wires 558 and 559 of the cable 550, respectively.

The conversion from electrical-to-optical signal domain and vice-versa allows the data communication cable assembly 500 to be made significantly longer because the optical transmission mediums 552 and 554 are typically less lossy and have higher bandwidth as compared to electrical wire mediums. This facilitates placement of electronic devices in homes, offices, commercial or industrial setting with more flexibility as the data communication cable assembly may have sufficient length to accommodate the placement of such devices.

Figure 5B:
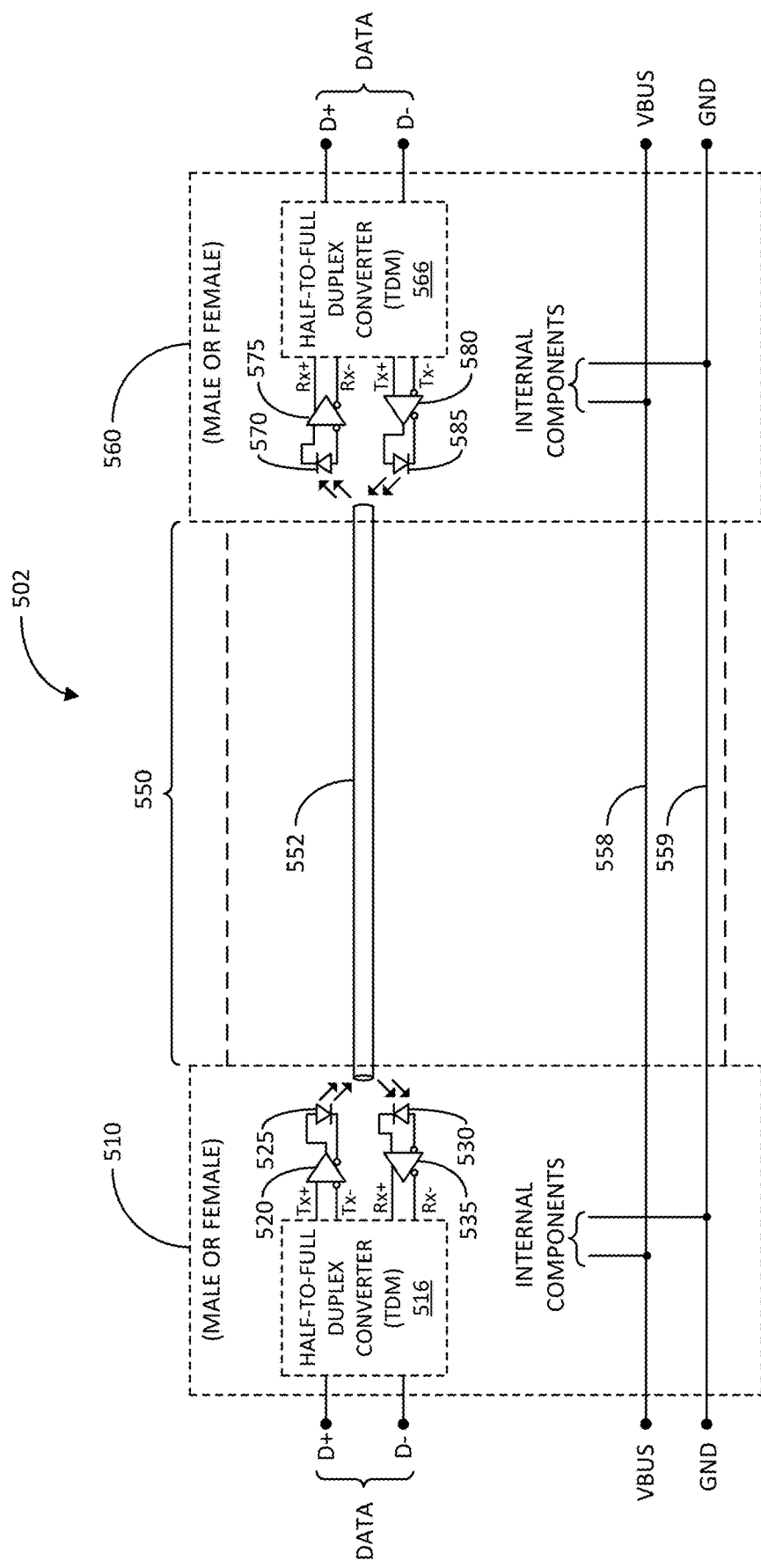
FIG. 5B illustrates a block/schematic diagram of another exemplary data communication cable assembly configured for half-duplex, time division multiplexed (TDM) data transmission over at least one optical medium in accordance with another aspect of the disclosure.

FIG. 5B illustrates a block/schematic diagram of another exemplary data communication cable assembly 502 configured for half-duplex data transmission over at least one optical transmission medium (e.g., an optical fiber) in accordance with another aspect of the disclosure. The data communication cable 502 is similar to that of data communication cable assembly 500, and includes many similar elements as indicated by the same reference numbers. The data communication cable assembly 502 differs from data communication cable assembly 500 in that cable assembly 502 is configured for half-duplex, time division multiplexing (TDM) data transmission over an optical transmission medium. Accordingly, the focus of the following discussion of data communication cable assembly 502 is its difference with data communication cable assembly 500.

In particular, the first connector 510 includes a half-to-full duplex converter (TDM) 516 configured to receive a downlink differential data signal D+/D− from the first device, and process the signal for transmission to the second device via an optical transmission medium 552 and the second connector 560. The half-to-full duplex converter (TDM) 516 is also configured to receive an uplink differential data signal D+/D− from the second device via the second connector 560 and the optical transmission medium 552. The processing of the differential data signal D+/D− by the first half-to-full duplex converter (TDM) 516 is similar to that of the first half-to-full duplex converter 515 previously discussed, e.g., receiving a downlink data signal from and sending an uplink data signal to the first device in a half- or full-duplex manner.

However, in this case, the first half-to-full duplex converter (TDM) 516 transmits and receives the uplink and downlink differential data signals D+/D− via the optical transmission medium 552 in a time division multiplexed (TDM) manner. That is, within a first time interval, the first half-to-full duplex converter (TDM) 516 including the LDD 520 and the LD 525 transmits the downlink optical data signal D+/D− via the optical transmission medium 552, and within a second time interval (substantially non-overlapping with the first time interval) the first half-to-full duplex converter (TDM) 516 including the PD 530 and TIA 535 receive the uplink optical data signal D+/D− from optical transmission medium 552.

Similarly, the second connector 560 includes a second half-to-full duplex converter (TDM) 566 configured to receive a downlink differential data signal D+/D− from the first device via the first connector 510 and cable 550, and process the signal for transmission to the second device. The second half-to-full duplex converter (TDM) 566 is also configured to receive an electrical uplink data signal D+/D− from the second device and process the signal for transmission to the first device via the optical transmission medium 552 and the first connector 510. The processing of the differential data signal D+/D− by the second half-to-full duplex converter (TDM) 566 is similar to that of the first half-to-full duplex converter (TDM) 565 previously discussed, e.g., receiving an electrical uplink data signal from and sending an electrical downlink data signal to the second device in a half- or full-duplex manner.

However, in this case, the second half-to-full duplex converter (TDM) 566 transmits and receives the uplink and downlink data signals D+/D− via the optical transmission medium 552 in a time division multiplexed (TDM) manner. That is, within a first time interval, the second half-to-full duplex converter (TDM) 566 including the LDD 580 and the LD 585 transmits an uplink optical data signal D+/D− via the optical transmission medium 552, and within a second time interval (substantially non-overlapping with the first time interval) the second half-to-full duplex converter (TDM) 566 including the PD 570 and TIA 575 receive the optical downlink data signal D+/D− via the optical transmission medium 552.

Figure 5C:
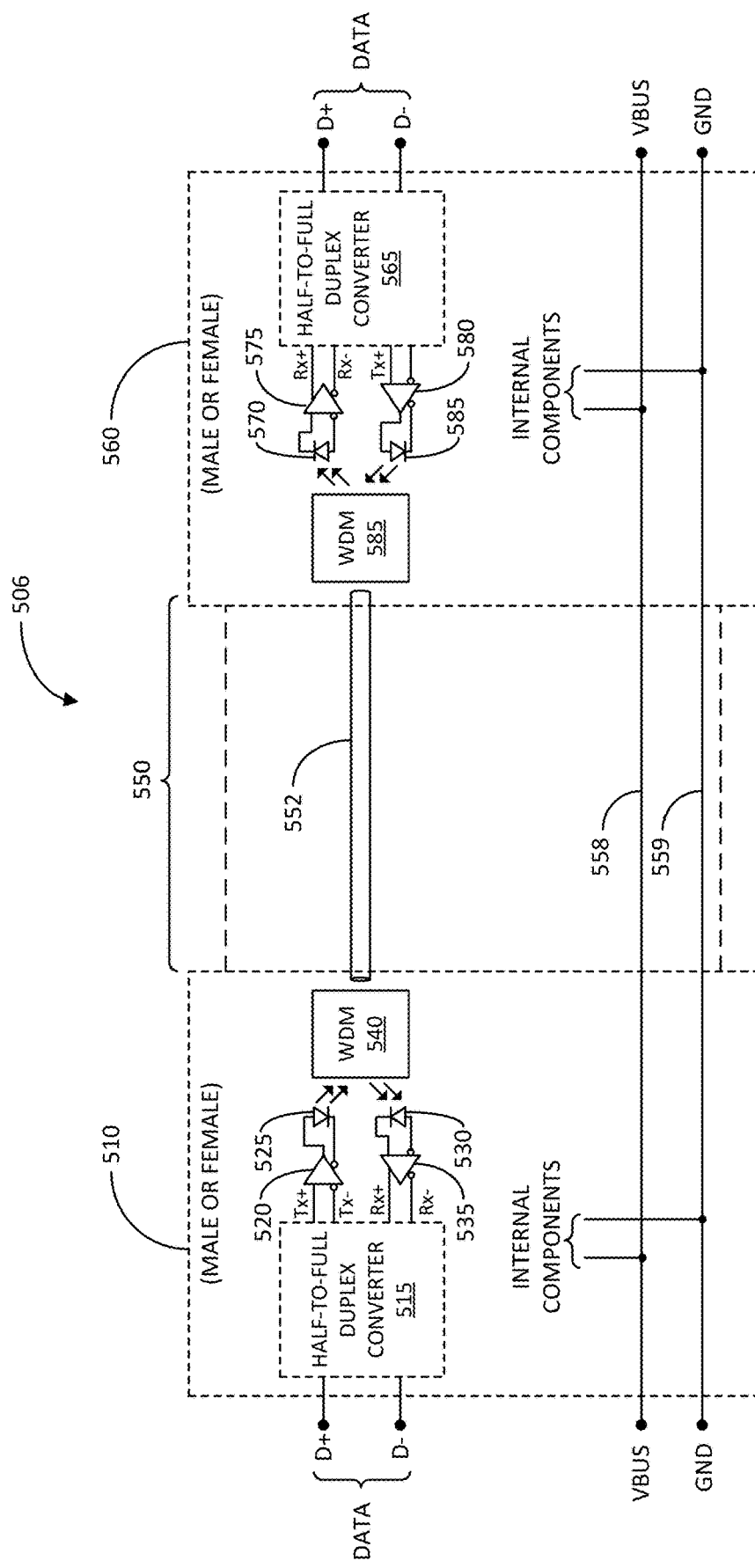
FIG. 5C illustrates a block/schematic diagram of another exemplary data communication cable assembly configured for full-duplex, wavelength division multiplexed (WDM) data transmission over at least one optical medium in accordance with another aspect of the disclosure.

FIG. 5C illustrates a block/schematic diagram of another exemplary data communication cable assembly 506 configured for full-duplex data transmission over at least one optical transmission electrical medium (e.g., an optical fiber) in accordance with another aspect of the disclosure. The data communication cable 506 is similar to that of data communication cable assemblies 500 and 502, and includes many similar elements as indicated by the same reference numbers. The data communication cable assembly 506 differs from data communication cable assemblies 500 and 502 in that cable assembly 506 is configured for full-duplex, wavelength division multiplexing (WDM) data transmission over an optical transmission medium. Accordingly, the focus of the following discussion of data communication cable assembly 506 is its difference with data communication cable assemblies 500 and 502.

In the case of data communication cable assembly 506, the half-to-full duplex converter 515 transmits and receives downlink and uplink differential data signals D+/D− via the optical transmission medium 552 in a wavelength division multiplexed (WDM) manner. That is, within a first wavelength range, the half-to-full duplex converter 515 including the LDD 520, the LD 525, and a wavelength division multiplexer (WDM) 540 transmit the downlink optical differential data signal D+/D− via the optical transmission medium 552, and within a second wavelength range (substantially non-overlapping with the first wavelength range) the half-to-full duplex converter 515 including the WDM 540, PD 530, and the TIA 535 receive the uplink optical differential data signal D+/D− from optical transmission medium 552.

Similarly, the second half-to-full duplex converter (TDM) 565 transmits and receives the uplink and downlink differential data signals D+/D− via the optical transmission medium 552 in a wavelength division multiplexed (WDM) manner. That is, within a first wavelength range, the second half-to-full duplex converter (TDM) 565 including the LDD 580, laser diode 585, and a wavelength division multiplexer (WDM) 585 transmits an uplink optical differential data signal D+/D− via the optical transmission medium 552, and within a second wavelength range (substantially non-overlapping with the first wavelength range) the second half-to-full duplex converter 566 including the WDM 585, PD 570, and TIA 575 receive the downlink optical differential data signal D+/D− via the optical transmission medium 552.

Figure 6:
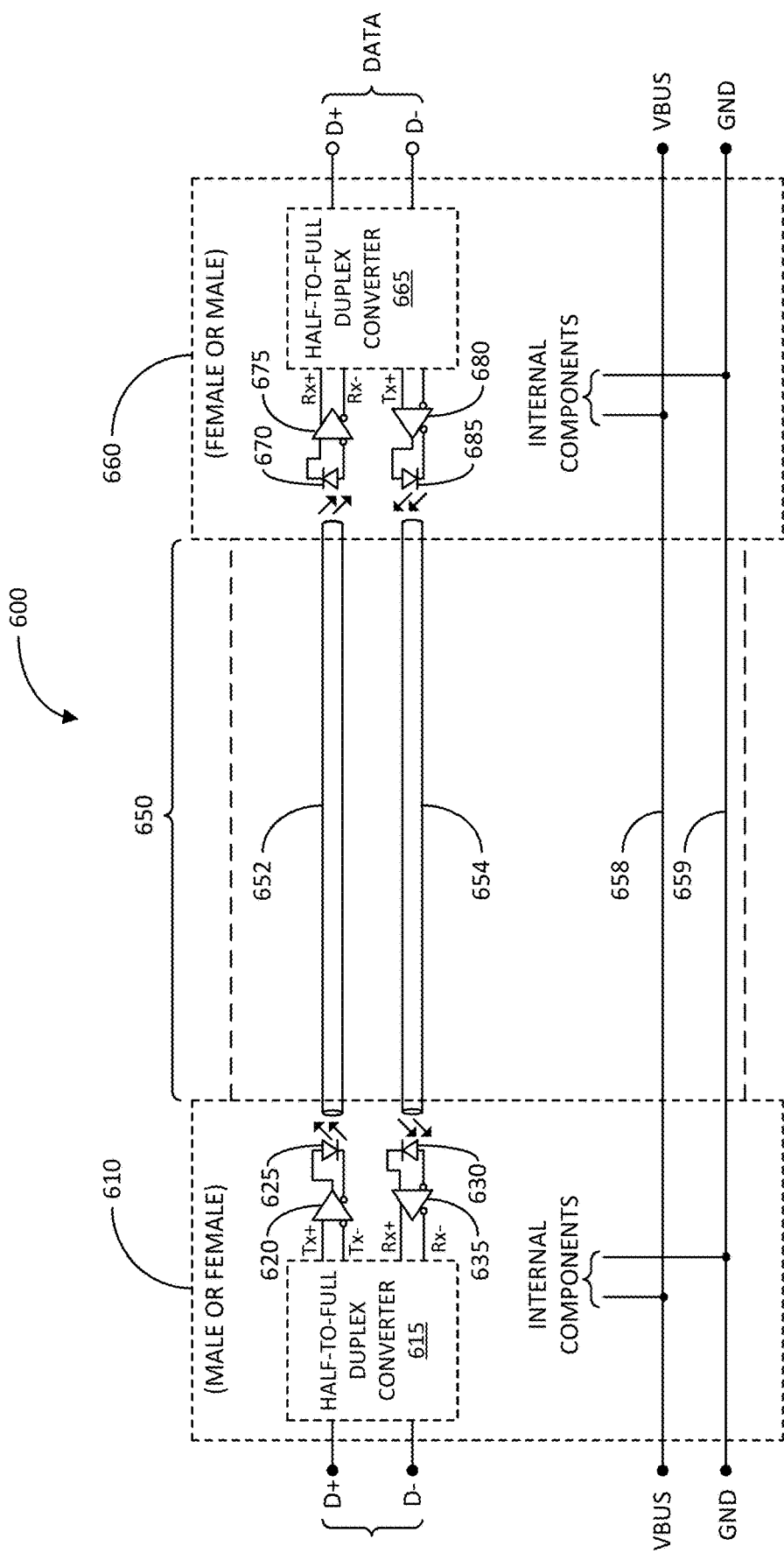
FIG. 6 illustrates a block/schematic diagram of an exemplary cascadable data communication cable assembly including one or more optical mediums in accordance with another aspect of the disclosure.

FIG. 6 illustrates a block/schematic diagram of an exemplary cascadable data communication cable assembly 600 including optical transmission mediums in accordance with another aspect of the disclosure. The cascadable data communication cable assembly 600 is similar to that of data communication cable assembly 500 with similar elements identified by the same reference numbers except the most significant digital (MSD) is a "6" instead of a "5". However, it shall be understood that the cascadable data communication cable assembly 600 may be configured similar to data communication cable assemblies 502 and 506.

In particular, the cascadable data communication cable assembly 600 includes a first connector 610 with a half-to-full duplex converter 615, LDD 620, LD 625, PD 630, and TIA 635, a cable 650 with one or more optical transmission mediums 652 and 654, and a second connector 660 with a half-to-full duplex converter 665, LDD 680, LD 685, PD 670, and TIA 675. The data communication cable assembly 600 further includes power signal (VBUS, GND) electrical conductors in the first connector 610, electrical wires 658 and 659 in the cable 650, and electrical conductors in the second connector 660.

The cascadable communication cable assembly 600 differs from data communication cable 500 in that the second connector 660 is of the opposite mating type (female or male) as that of the first connector 610. This feature allows a set of two or more cable assemblies 600 to be cascaded to form a longer length cable. Such as by connecting the second connector of one of the cables to the first connector of the cascaded or following/preceded cable, and so on. An example of a data communication system with a set of cascaded data communication cable assemblies is described below.

FIG. 7A illustrates a block diagram of an exemplary data communication system 700 including a set of cascaded data communication cable assemblies in accordance with another aspect of the disclosure. The data communication system 700 includes a first device 710. In the case of a USB-compliant system 700, the first device 710 may be a host device.

The data communication system 700 further includes two or more data communication cable assemblies 600-1MF, 600-2MF, and 600-3MF (e.g., three or any number as desired) cascaded to form a longer cable. Each of the cable assemblies 600-1MF, 600-2MF, and 600-3MF may be configured similar to data communication cable assembly 600.

The data communication cable assembly 600-1MF includes a first male connector mated with a female connector of the first device 710. The data communication cable assembly 600-2MF includes a first male connector mated with a second female connector of data communication cable assembly 600-1MF. The data communication cable assembly 600-3MF includes a first male connector mated with a second female connector of data communication cable assembly 600-2MF. As the data communication cable 600-3 may have a second female connector, it may not be able to mate with the female connector of a second device 720. In the case of a USB-compliant system 700, the second device 720 may be a peripheral device.

Accordingly, the data communication system 700 includes a data communication cable assembly 500-MM that includes both male first and second connectors. This allows the data communication cable assembly 500 to mate with the second female connector of the data communication cable assembly 600-3MF and the female connector of the second device 720. The data communication cable assembly 500-MM may be configured similar to data communication cable assembly 500 (or 502 or 506).

Thus, the cables 600-1MF, 600-2MF, 600-3MF, and 500-MM may be cascadable or daisy-chained to form longer length cables in order to meet the distance requirements for desirably-placed devices. As the cables 600-1MF, 600-2MF, 600-3MF, and 500-MM include low loss and distortion optical transmission mediums, the data signal communicated between the first and second devices 710 and 720 may be successfully transmitted and recovered.

FIG. 7B illustrates a block diagram of an exemplary data communication system 750 including a set of cascaded data communication cable assemblies in accordance with another aspect of the disclosure. The data communication system 750 includes a first device 760. In the case of a USB-compliant system 750, the first device 760 may be a host device.

The data communication system 750 further includes two or more data communication cable assemblies 500-MM, 600-1FM, 600-2FM, and 600-3FM (e.g., four or any number as desired) cascaded to form a longer cable. The data communication cable assembly 500-MM may be configured similar to data communication cable assembly 500 (or 502 or 506). Each of the cable assemblies 600-1MF, 600-2MF, and 600-3MF may be configured similar to data communication cable assembly 600.

The data communication cable assembly 500-MM includes a first male connector mated with a female connector of the first device 760. The data communication cable assembly 600-1FM includes a first female connector mated with a second male connector of data communication cable assembly 500-MM. The data communication cable assembly 600-2FM includes a first female connector mated with a second male connector of data communication cable assembly 600-1FM. The data communication cable assembly 600-3FM includes a first female connector mated with a second male connector of data communication cable assembly 600-2MF. The data communication cable 600-3FM includes a second male connector mated with the female connector of a second device 770. In the case of a USB-compliant system 700, the second device 770 may be a peripheral device.

Thus, the cables 500-MM, 600-1FM, 600-2FM, and 600-3FM may be cascadable or daisy-chained to form longer length cables in order to meet the distance requirements for desirably-placed devices. As the cables 500-MM, 600-1FM, 600-2FM, and 600-3FM include low loss and distortion optical transmission mediums, the data signal communicated between the first and second devices 760 and 770 may be successfully transmitted and recovered.

Figure 8A:
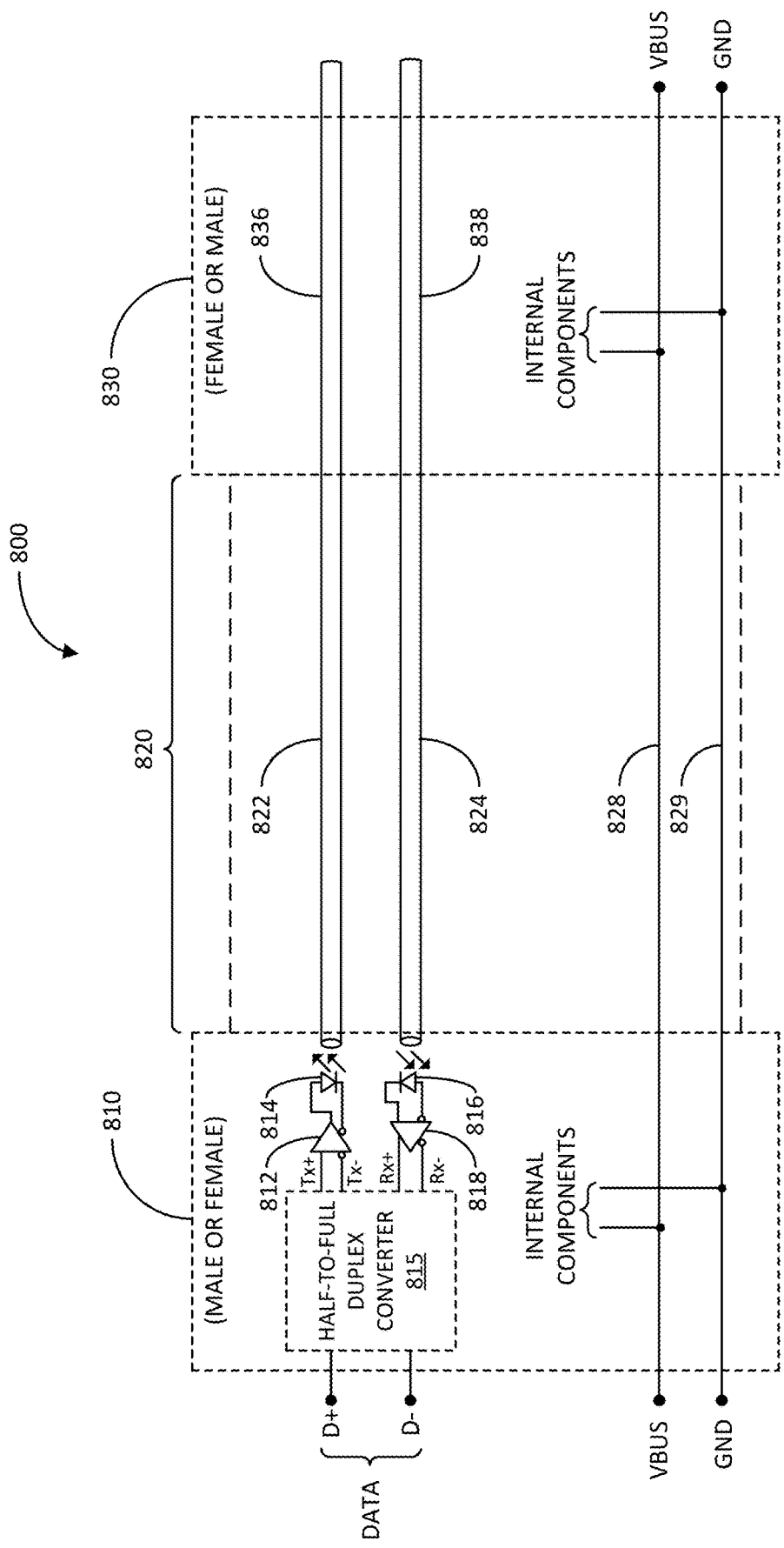
FIG. 8A illustrates a block/schematic diagram of another exemplary host-side cascadable data communication cable assembly including one or more optical mediums in accordance with another aspect of the disclosure.

FIG. 8A illustrates a block/schematic diagram of an exemplary host-side cascadable data communication cable assembly 800 including one or more optical transmission mediums in accordance with another aspect of the disclosure. The cascadable data communication cable assembly 800 includes a first connector similar to that of data communication cable assembly 500, but a second connector that is in the optical domain for data transmission. Thus, the cascadable data communication cable assembly 800 includes a first connector 810 with a half-to-full duplex converter 815, LDD 812, LD 814, PD 816, and TIA 818, and a cable 820 with one or more optical transmission mediums 822 and 824. The data communication cable assembly 800 further includes power signal (VBUS, GND) electrical conductors in the first connector 810, electrical wire mediums 828 and 829 in the cable 820, and electrical conductors in the second connector 830.

The cascadable data communication cable assembly 800 differs from data communication cable assembly 500 in that the second connector 830 is of the opposite mating type (female or male) as that of the first connector 810. This feature facilitates cascading the cable assemblies, as discussed in more detail herein. Another difference between data communication cable assembly 800 and data communication cable assembly 500 is that the peripheral-side of the second connector 830 continues in optical domain. In this regard, the optical transmission mediums 822 and 824 of the cable 830 may extend into and through the second connector 830 for optical connection to other optical transmission mediums in the another cable.

Figure 8B:
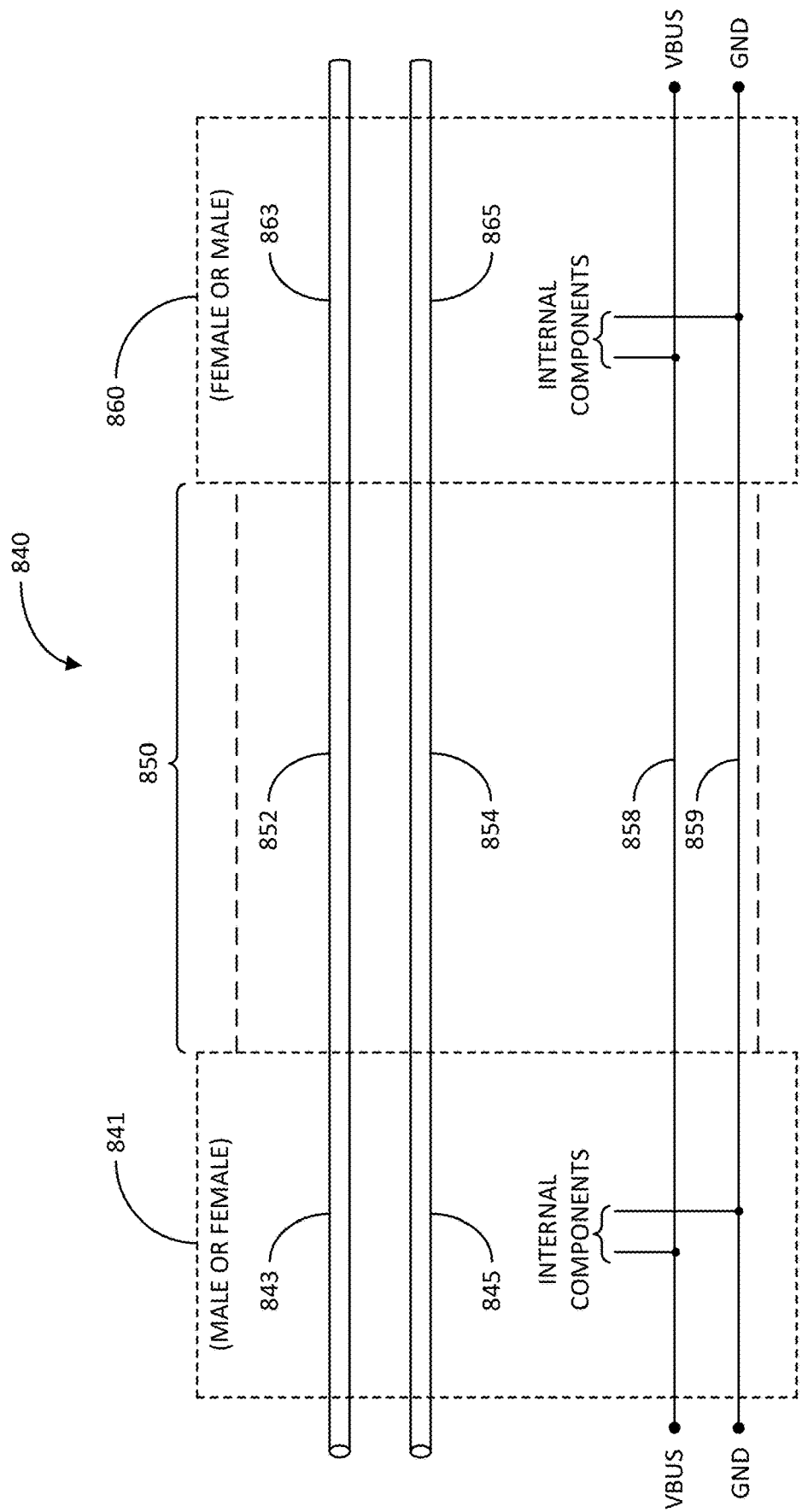
FIG. 8B illustrates a block/schematic diagram of another exemplary intermediate cascadable data communication cable assembly including one or more optical mediums in accordance with another aspect of the disclosure.

FIG. 8B illustrates a block/schematic diagram of another exemplary intermediate cascadable data communication cable assembly 840 including one or more optical transmission mediums in accordance with another aspect of the disclosure. The cascadable data communication cable assembly 840 includes first and second connectors that are in the optical domain for data transmission. The data communication cable assembly 840 further includes power signal (VBUS, GND) electrical conductors in the first connector 841, electrical wires 858 and 859 in the cable 850, and electrical conductors in the second connector 860.

More specifically, the data communication cable assembly 840 includes a first connector 841 (male or female) including optical transmission mediums 843 and 845 for optically coupling to optical transmission mediums of a data communication cable assembly to which it mates on the left side of the cable assembly 840. The optical data signals may be transmitted between the first and second connectors 841 and 860 via optical transmission mediums 852 and 854 of the cable 850, respectively. Similarly, the second connector 860 (female or male) includes optical transmission mediums 863 and 865 for optically coupling to optical transmission mediums of a data communication cable assembly to which it mates on the right side of the cable assembly 840.

Figure 8C:
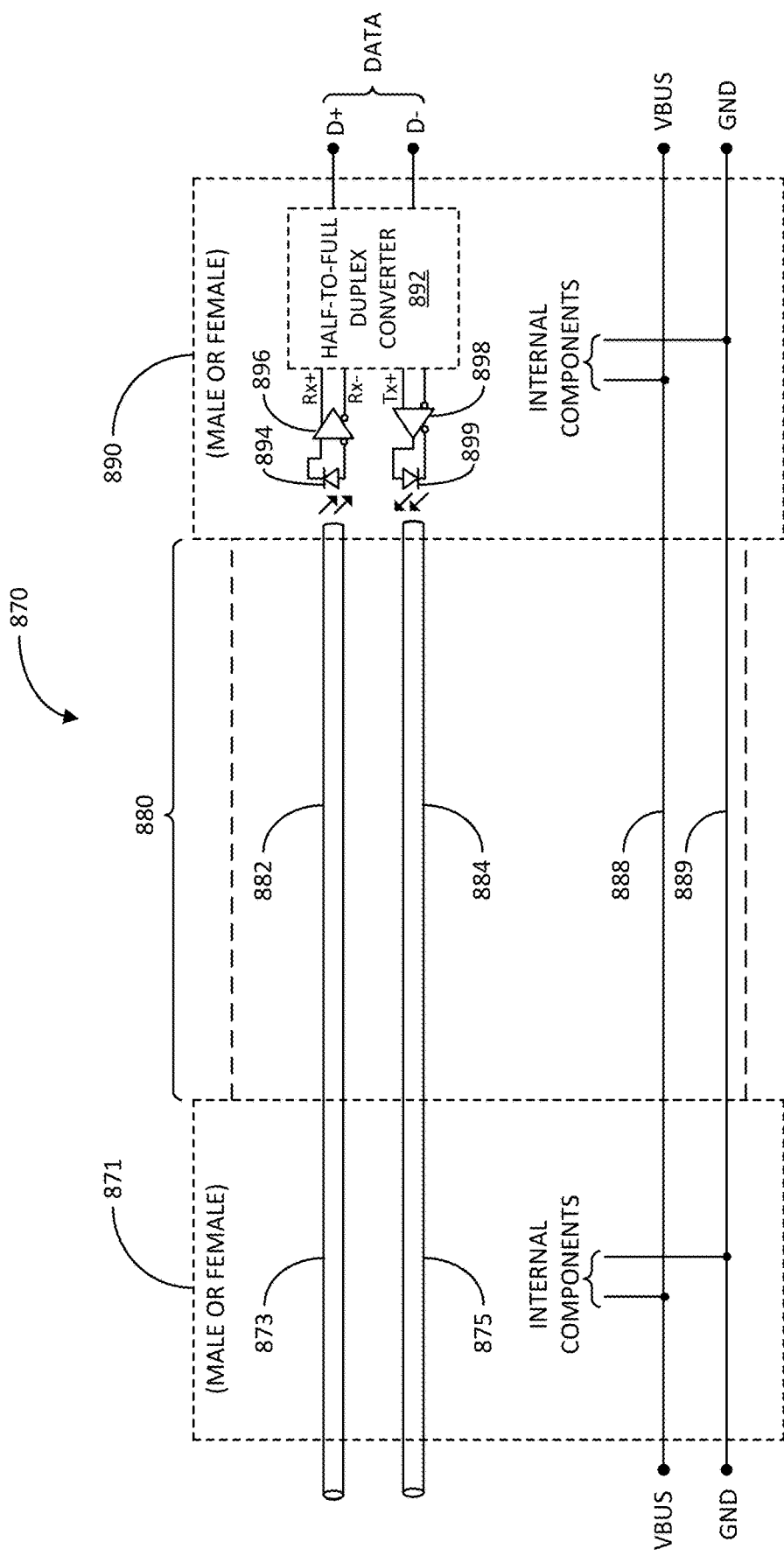
FIG. 8C illustrates a block/schematic diagram of another exemplary peripheral-side cascadable data communication cable assembly including one or more optical mediums in accordance with another aspect of the disclosure.

FIG. 8C illustrates a block/schematic diagram of another exemplary peripheral-side cascadable data communication cable assembly 870 including one or more optical transmission mediums in accordance with another aspect of the disclosure. The cascadable data communication cable assembly 870 includes a first connector similar to that of data communication cable assembly 840, and a second connector similar to that of data communication cable assembly 500 (but of the opposite mating type). The data communication cable assembly 870 further includes power signal (VBUS, GND) electrical conductors in the first connector 871, electrical wires 888 and 889 in the cable 880, and electrical conductors in the second connector 890.

More specifically, the data communication cable assembly 870 includes a first connector 871 (male or female) including optical transmission mediums 873 and 875 for optically coupling to optical transmission mediums of a data communication cable assembly to which it mates on the left side of the cable assembly 840.

The second connector 890 (male or female) includes a half-to-full duplex converter 892 configured to send and/or receive downlink and uplink differential data signals D+/D− to and/or from the second device. The second connector 890 further includes a photo diode or detector (PD) 894 configured to receive a downlink optical signal modulated with a data signal originating from the first device via the first connector 871 and the optical transmission medium 882. The PD 894 converts the modulated optical signal into a modulated current. The second connector 890 further includes a transimpedance amplifier (TIA) 896 configured to convert the modulated current into a downlink differential data voltage signal Rx+/Rx−. The half-to-full duplex converter 892 sends the differential data voltage signal Rx+/Rx− as an electrical downlink data signal D+/D− to the second device.

The second connector 890 further includes a laser diode driver (LDD) 898 configured to receive an electrical uplink data signal Tx+/Tx−, and generate a drive signal for a laser diode (LD) 899. The LD 899, in turn, generates an optical uplink data signal modulated with the data signal for transmission to the first device via the optical transmission medium 884 and the first connector 871.

Figure 9:
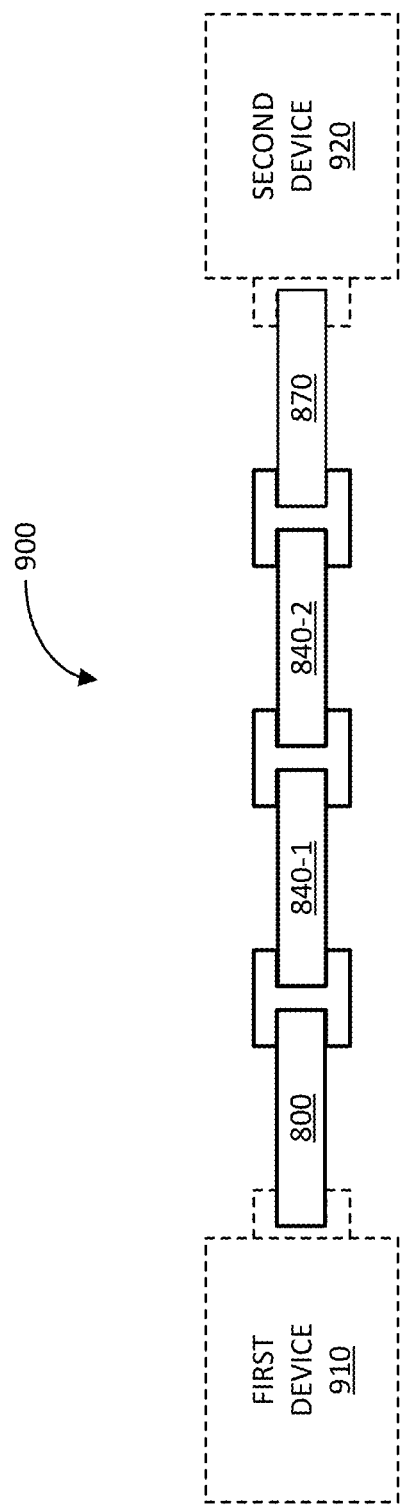
FIG. 9 illustrates a block diagram of another exemplary data communication system including a set of cascaded data communication cable assemblies in accordance with another aspect of the disclosure.

FIG. 9 illustrates a block diagram of an exemplary data communication system 900 including a set of cascaded data communication cable assemblies in accordance with another aspect of the disclosure. The data communication system 900 includes a first device 910. In the case of a USB-compliant system 900, the first device 910 may be a host device.

The data communication system 900 further includes two or more data communication cable assemblies 800, 840-1 and 840-2 (e.g., two or any other number), and 870 cascaded to form a longer cable. The data communication cable assembly 800 on the left may be connected to the first device 710. The left-middle data communication cable assembly 840-1 is connected to the left data communication cable assembly 800 and to the right-middle data communication cable assembly 840-2. As the right-middle data communication cable 840-2 may have a right female connector, it may not be able to mate with the female connector of a second device 920. In the case of a USB-compliant system 900, the second device 920 may be a peripheral device.

Accordingly, the data communication system 900 includes a right-most data communication cable assembly 870 that includes both male first and second connectors. This allows the data communication cable assembly 870 to mate with the female connector of the right-middle data communication cable assembly 840-2 and the female connector of the second device 920. Thus, the cable assemblies 800, 840-1, 840-2, and 870 may be cascadable or daisy-chained to form longer length cables in order to meet the distance requirements for desirably-placed devices. As the cable assemblies 800, 840-1, 840-2, and 870 include low loss and distortion optical transmission mediums, the data signal communicated between the first and second devices 910 and 920 may be successfully transmitted and recovered.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A data communication cable assembly, comprising:
    a first connector configured to mate with a connector of a first device;
    a second connector configured to mate with a connector of another data communication cable assembly for data coupling to a second device; and
    a cable including opposite ends attached to the first and second connectors, respectively, wherein the cable comprises one or more data transmission mediums configured to transmit one or more data signals between the first and second connectors;
    wherein the one or more data transmission mediums comprises one or more electrical wire mediums, and wherein the second connector comprises a first clock and data recovery (CDR) configured to recover clock and data from the one or more data signals received from the one or more electrical wire mediums.

2. The data communication cable assembly of claim 1, wherein the first connector comprises a first signal extender configured to modify the one or more data signals to improve the transmission of the data signal between the first and second devices.

3. The data communication cable assembly of claim 2, wherein the one or more data signals comprises a downlink data signal, and wherein the first signal extender comprises one or more of the following:
    a transmit driver configured to amplify the downlink data signal received from the first device prior to transmission via the one or more electrical wire mediums;
    a pre-emphasizer configured to pre-emphasize the downlink data signal received from the first device prior to transmission via the one or more electrical wire mediums; or
    a channel filter configured to filter the downlink data signal received from the first device prior to transmission via the one or more electrical wire mediums.

4. The data communication cable assembly of claim 2, wherein the one or more data signals comprises an uplink data signal, and wherein the first signal extender comprises one or more of the following:
    an amplifier configured to amplify the uplink data signal received from the one or more electrical wire mediums;
    an equalizer configured to equalize the uplink data signal received from the one or more electrical wire mediums;
    a second clock and data recovery (CDR) configured to recover a clock and data from the uplink data signal received from the one or more electrical wire mediums; or
    a forward error correction (FEC) configured to correct one or more errors in data recovered from the uplink data signal received from the one or more electrical wire mediums.

5. The data communication cable assembly of claim 2, wherein the one or more electrical wire mediums is configured to electrically couple to one or more other electrical wire mediums in the another data communication cable assembly.

6. The data communication cable assembly of claim 1, wherein the second connector comprises a second signal extender configured to modify the one or more data signals to improve the transmission of the data signal between the first and second devices.

7. The data communication cable assembly of claim 6, wherein the one or more data signals comprises an uplink data signal, and wherein the second signal extender comprises one or more of the following:
- a transmit driver configured to amplify the uplink data signal received from the another data communication cable assembly prior to transmitting the uplink data signal via the one or more electrical wire mediums;
- a pre-emphasizer configured to pre-emphasize the uplink data signal received from the another data communication cable assembly prior to transmitting the uplink data signal via the one or more electrical wire mediums; or
- a channel filter configured to filter the uplink data signal received from the another data communication cable assembly prior to transmitting the uplink data signal via the one or more electrical wire mediums.

8. The data communication cable assembly of claim 6, wherein the one or more data signals comprises a downlink data signal, and wherein the second signal extender comprises one or more of the following:
- an amplifier configured to amplify the downlink data signal received from the one or more electrical wire mediums;
- an equalizer configured to equalize the downlink data signal received from the one or more electrical wire mediums;
- a forward error correction (FEC) configured to correct one or more errors in data recovered from the downlink data signal received from the one or more electrical wire mediums.

9. The data communication cable assembly of claim 1, wherein the one or more transmission mediums comprises one or more optical transmission mediums, wherein the one or more data signals comprises an optical downlink data signal, and wherein the first connector comprises a circuit configured to convert an electrical downlink data signal received from the first device into the optical downlink data signal for transmission to the second connector via the one or more optical transmission mediums.

10. The data communication cable assembly of claim 1, wherein the one or more transmission mediums comprises one or more optical transmission mediums, wherein the one or more data signals comprises an optical uplink data signal, and wherein the first connector comprises a circuit configured to convert the optical uplink data signal to an electrical uplink data signal for transmission to the first device.

11. The data communication cable assembly of claim 1, wherein the one or more transmission mediums comprises one or more optical transmission mediums configured to optically connect to one or more other optical transmission mediums in the another data communication cable assembly.

12. The data communication cable assembly of claim 1, wherein the one or more transmission mediums comprises one or more optical transmission mediums, wherein the one or more data signals comprises an optical downlink data signal, and wherein the second connector comprises a circuit configured to convert the optical downlink data signal into an electrical downlink data signal for transmission via the another data communication cable assembly.

13. The data communication cable assembly of claim 1, wherein the one or more transmission mediums comprises one or more optical transmission mediums, wherein the one or more data signals comprises an optical uplink data signal, and wherein the second connector comprises a circuit configured to convert an electrical uplink data signal received from the another data communication cable assembly to the optical uplink data signal.

14. A first data communication cable assembly, comprising:
- a first connector configured to mate with a connector of a second data communication cable assembly for data coupling to a first device;
- a second connector configured to mate with a connector of a third data communication cable assembly for data coupling to a third device; and
- a cable including opposite ends attached to the first and second connectors, respectively, wherein the cable comprises one or more optical transmission mediums configured to transmit one or more data signals between the first and second connectors;
- wherein the one or more data transmission mediums further comprises one or more electrical wire mediums, and wherein the first or second connector comprises a clock and data recovery (CDR) configured to recover clock and data from the one or more data signals received from the one or more electrical wire mediums.

15. The first data communication cable assembly of claim 14, wherein the one or more electrical wire mediums is configured to route a power signal between the first and second connectors.

16. A data communication cable assembly, comprising:
- a first connector configured to mate with a connector of another data communication cable assembly for data coupling to a first device;
- a second connector configured to mate with a connector of a second device; and
- a cable including opposite ends attached to the first and second connectors, respectively, wherein the cable comprises one or more data transmission mediums configured to transmit one or more data signals between the first and second connectors;
- wherein the one or more data transmission mediums comprises one or more electrical wire mediums, and wherein the first connector comprises a first clock and data recovery (CDR) configured to recover clock and data from the one or more data signals received from the one or more electrical wire mediums.

17. The data communication cable assembly of claim 16, wherein the second connector comprises a signal extender configured to modify the one or more data signals to improve the transmission of the data signal between the first and second devices.

18. The data communication cable assembly of claim 17, wherein the one or more electrical wire mediums configured to electrically couple to one or more other electrical wire mediums in the another data communication cable assembly.

19. The data communication cable assembly of claim 16, wherein the one or more data transmission mediums comprises one or more optical transmission mediums, and wherein the second connector comprises a circuit configured to convert the one or more data signals from electrical to optical domain or from optical to electrical domain.

20. The data communication cable assembly of claim 19, wherein the one or more optical transmission mediums configured to optically connect to one or more other optical transmission mediums in the another data communication cable assembly.

* * * * *